United States Patent
Maehata et al.

(10) Patent No.: US 7,455,944 B2
(45) Date of Patent: Nov. 25, 2008

(54) TONER FOR DEVELOPING ELECTROSTATIC LATENT IMAGES AND MANUFACTURING METHOD THEREOF, DEVELOPER FOR DEVELOPING ELECTROSTATIC LATENT IMAGES, IMAGE FORMING METHOD, AND METHOD FOR MANUFACTURING DISPERSION OF RESIN PARTICLES

(75) Inventors: Hideo Maehata, Minamiashigara (JP); Yasuo Yamamoto, Minamiashigara (JP); Satoshi Hiraoka, Minamiashigara (JP); Yasuo Matsumura, Minamiashigara (JP); Hirotaka Matsuoka, Minamiashigara (JP); Yuki Sasaki, Minamiashigara (JP); Fumiaki Mera, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 441 days.

(21) Appl. No.: 11/221,798

(22) Filed: Sep. 9, 2005

(65) Prior Publication Data
US 2006/0216625 A1    Sep. 28, 2006

(30) Foreign Application Priority Data
Mar. 25, 2005  (JP) ............................ 2005-090274
Mar. 28, 2005  (JP) ............................ 2005-093332

(51) Int. Cl.
*G03G 9/087* (2006.01)
(52) U.S. Cl. .................... 430/109.3; 430/137.14; 430/124.1
(58) Field of Classification Search .............. 430/109.3, 430/109.1, 137.14, 137.15, 124, 120.1
See application file for complete search history.

(56) References Cited

U.S. PATENT DOCUMENTS 4,355,154 A   10/1982  Saam et al.
4,931,375 A * 6/1990  Akimoto et al. .......... 430/109.3
4,940,644 A * 7/1990  Matsubara et al. ....... 430/109.4
5,965,313 A   10/1999  Mizutani et al.

FOREIGN PATENT DOCUMENTS

| EP | 0 254 543 A2 | 1/1988 |
| JP | B2 56-13943 | 4/1981 |
| JP | B2 62-39428 | 8/1987 |
| JP | A 1-163756 | 6/1989 |
| JP | A 2-79860 | 3/1990 |
| JP | A 7-219274 | 8/1995 |
| JP | A 9-15902 | 1/1997 |
| JP | A 2001-42564 | 2/2001 |
| JP | A 2001-42568 | 2/2001 |

OTHER PUBLICATIONS

M Barrere et al "Polyester synthesis in aqueous miniemulsion" Polymer 44 (May 2003) pp. 2833-2841.*
Takasu et al., "Synthesis of Aliphatic Polyesters by Direct Polyesterification of Dicarboxylic Acids with Diols under Mild Conditions catalyzed by Reusable Rare-Earth Triflate," Macromolecules, vol. 36, pp. 1772-1774, 2003.

* cited by examiner

Primary Examiner—John L Goodrow
(74) Attorney, Agent, or Firm—Oliff & Berridge PLC

(57) ABSTRACT

The present invention provides a toner for developing electrostatic latent images, including resin particles containing a crystalline polymer and an amorphous polymer, wherein the amorphous polymer and the crystalline polymer satisfy the relationship represented by the following formula (1), and a method for manufacturing the toner of the invention. The present invention also provides a developer for electrostatic latent images including the toner of the invention and a carrier; and an image forming method using the toner of the invention. Further the invention provides a method for manufacturing a dispersion of resin particles.

$$\delta a - \delta c \geq 1.05 [(cal/ml)^{1/2}(25° C.)] \quad \text{Formula (1)}$$

In formula (1), $\delta a$ represents a solubility parameter of the amorphous polymer, and $\delta c$ represents a solubility parameter of the crystalline polymer.

17 Claims, No Drawings

TONER FOR DEVELOPING ELECTROSTATIC LATENT IMAGES AND MANUFACTURING METHOD THEREOF, DEVELOPER FOR DEVELOPING ELECTROSTATIC LATENT IMAGES, IMAGE FORMING METHOD, AND METHOD FOR MANUFACTURING DISPERSION OF RESIN PARTICLES

CROSS-REFERENCE TO RELATED APPLICATION

This application claims priority under 35 USC 119 from Japanese Patent Applications Nos. 2005-93332 and 2005-90274, the disclosures of which are incorporated by reference herein.

BACKGROUND OF THE INVENTION

1. Field of the Invention

The present invention relates to a toner for developing electrostatic latent images to be used in electrophotographic apparatuses that utilize an electrophotographic process, such as copying machines, printers, facsimiles, and the like, and a manufacturing method therefor; a developer for electrostatic latent images using the toner for developing electrostatic latent images; and an image forming method utilizing the toner for developing electrostatic latent images. In addition, the present invention also relates to a method for manufacturing a dispersion of resin particles to be utilized as a constituent material for the toner for developing electrostatic latent images.

2. Description of the Related Art

Methods for visualizing image information through an electrostatic latent image, such as the electrophotographic method, or the like, are widely used in various fields at present. With the electrophotographic method, an electrostatic latent image on the surface of a photosensitive material is developed through a charging step, an exposure process, and the like, and the electrostatic latent image is visualized through a transfer step, a fixing step, and the like.

A number of methods are known as electrophotographic methods. In general, a latent image is formed electrically by one of various means on the surface of a photoreceptor (latent image holding material) which utilizes a photoconductive substance. The formed latent image is developed using a toner, and thus a toner image is formed. Thereafter, the toner image on the surface of the photoreceptor is transferred onto the surface of a transfer material such as paper or the like via or not via an intermediate transfer material. The transferred image is subjected to a plurality of fixing processes such as heating, pressurizing, heat-pressurizing, and the like, such that a fixed image is formed. Toner which remains on the surface of the photoreceptor is cleaned by various methods as necessary and is again utilized for development of a toner image, as required.

As a fixing technique for fixing a transferred image which has been transferred onto the surface of a transfer material, a heat roll fixing method is generally known. In this method, a transfer material, onto which a toner image has been transferred, is inserted and fixed between a pair of rolls which is formed by a heat roll and a pressure roll.

On the other hand, with demand for saving the power required for image formation having increased in recent years, the technological development of the so-called low-temperature fixing toner which is intended to provide electric power saving in the fixing process, which is one of the processes consuming the highest amount of energy in the electrophotographic process, has been actively promoted.

In this case, lowering the fixing temperature for the toner generally means that the glass transition point for the toner is lowered simultaneously, which renders compatibility between the lowered fixing temperature and the desired toner shelflife, and the desired preservability (offset resistance) of the final output image obtained, difficult to achieve. Therefore, in order to render the lowered temperature fixing and the desired toner shelflife compatible, it is necessary to provide the toner with so-called sharp melting characteristics, which abruptly lowers the viscosity of the toner in the vicinity of the fixing temperature, with the glass transition point for the toner being maintained at a high temperature.

As a promising approach to this technological challenge, a method which uses a crystalline resin having sharp melting characteristics as the binder resin has been proposed.

However, it is difficult to obtain crystalline resin particles for use as toner particles, and even if the kneading pulverizing method is used in order to obtain such particles, the pulverization is difficult, the yield being low, which has presented a problem of low practicality from the viewpoint of manufacturability (see, for example, Japanese Patent Publication No. 56-13943 and Japanese Patent Publication No. 62-39428). In other words, as regards improving both the low temperature fixability and the offset resistance, the fusion kneading pulverizing method makes it difficult to use the crystalline resin which is effective in terms of low temperature fixability and offset resistance. Further, because pulverization is conducted made, it has been difficult to control the shape of the toner particles, particularly to sphericalize the toner particles, and to make the diameter of the toner particles smaller and the particle size distribution narrower for the purpose of enhancing the image quality.

As means for solving the above-mentioned problems, a technique which uses a crystalline resin and a non-crystalline resin in combination rather than using the crystalline resin alone as the binder resin has been reported. This is because the existence of the non-crystalline resin moiety facilitates the pulverization. Examples of this method include a method which uses a crystalline resin and a non-crystalline resin in combination (see Japanese Patent Publication Laid-Open (JP-A) No. 2-79860) and a method which uses a resin in which a crystalline resin is chemically bonded to a non-crystalline resin (see JP-A No. 1-163756). However, with the methods as disclosed in these literatures, the percentage of the non-crystalline resin is high, and thus the fusion of the entire toner is governed by the softening temperature of the non-crystalline resin, thus the effect of the low-temperature fixability has been low.

In addition, the dissolution suspension method and other wet type manufacturing methods which manufacture toner particles by a chemical approach have been examined (see JP-A No. 9-15902). When a wet type manufacturing method, such as the dissolution suspension method, or the like, is used, the toner particles, which are difficult to knead and pulverize, are dissolved in an organic solvent to be suspension-dispersed into an aqueous medium and can, thereby be easily manufactured. The shape of the toner particles can be controlled, and thus sphericalized toner particles can be manufactured with ease. The particle size distribution of the toner particles can also be controlled. However, with the dissolution suspension method using a crystalline polymer, it is difficult to uniformly disperse small-amount components, such as the colorant, and the like, into the toner. In addition, there are environmental problems related to using an organic solvent. In addition, the volume resistivity of a crystalline polymer is low, compared to that of a non-crystalline polymer in the molecular weight region which has been conventionally used, thus at present it is difficult to assure the charging characteristic required for electrophotography using a crystalline polymer alone.

In order to alleviate this problem, the emulsion polymerization aggregation method, which, in the solution with which a crystalline resin is dissolved in a radical polymerizable monomer for formation of an amorphous polymer, aggregates and fuses emulsified or suspended resin particles comprising these components to provide toner particles, has been proposed (see, for example, JP-A Nos. 2001-42564 and 2001-42568).

However, with these methods, the percentage of the crystalline polymer comprised in the toner is low, and thus they are not sufficient for obtaining the characteristics of the crystalline polymer. With these methods, characteristics such as low temperature fixability, image preservability, and the like, originating from the sharp melting characteristics inherent to a crystalline resin, cannot be effectively drawn out, and thus sufficient low-temperature fixing characteristics cannot be achieved. Further, for cases as described above, JP-A Nos. 2001-42564 and 2001-42568 indicate that it is important to form a micro-domain structure (the sea-island structure) in the final toner, and that the crystalline substance is dispersed as the domain (the island part) in the sea part of the amorphous polymer as the main component. However, in order to form this domain structure, it is, of course, impossible to use a crystalline substance as the main component.

In addition, with a toner manufacturing method which uses a crystalline resin to implement the emulsion polymerization aggregation method in an aqueous medium for manufacturing the toner particles, it is extremely difficult to control the particle diameter, the particle size distribution, and the charging characteristic of the toner, which is a major problem in terms of using the product as a toner. This is because it is difficult for the crystalline resin to provide the resin particles to be used for the emulsion polymerization aggregation method in the ordinary aqueous medium with sufficient chemical stability and mechanical stability, and in order to provide these, it is necessary to introduce an ionically dissociatable polarity group into the resin. However, this polarity group generally lowers the crystallinity of the resin, which is a problem in terms of the sharp melt low temperature fixing, at which the present invention aims.

In addition, in this case, in order to provide this function for the amorphous polymere and attach a polarity group to the surface of the particle, the mini-emulsion method as practiced in JP-A 2001-42564, for example, has been tried for copolymerization of a monomer comprising a polarity group with an amorphous polymer followed by use thereof; however, with the mini-emulsion method, mere copolymerization of a polarity group monomer in the aqueous medium is considered to be extremely difficult in terms of the polymerization mechanism, and thus with the emulsion polymerization aggregation method, it is extremely difficult to provide a sufficient control of the toner particle diameter and distribution.

Further, the same problem that the charging characteristic of a toner is poor due to the low volume receptivity of the crystalline resin is present also in a toner formed by the emulsion polymerization aggregation method, and at present, it is difficult to secure the charging characteristic required for electrophotography.

Thus, with the toner produced by the above-mentioned respective methods using the crystalline polymer, it is extremely difficult to secure a sufficient charging characteristic and offset resistance together with the low temperature fixability, which is an advantage of the crystalline polymer, and to provide a sufficient charging characteristic, particle size distribution characteristics, and the like, for the toner, and at present, no toner which meets the requirements for all these toner characteristics has been provided.

By using a polycondensed resin having a polyester structure, or the like, as the toner resin to be applied to the low temperature fixing technique technological development for such a purpose as reducing the energy for fixing, which consumes the highest amount of power in the electrophotographic process, is being actively promoted. This polyester resin has been generally manufactured by a polycondensation reaction at a high temperature above 150° C., but the technology for polymerization and manufacturing with a lower amount of energy (at a lower temperature) has been intensely demanded from the viewpoint of environmental load reduction. As a technique for polymerizing a polyester resin at a lower temperature, it has been found in recent years that polymerization can be carried out at a temperature below 100° C. by using a polymerization catalyst comprising a rare-earth element, such as scandium (Macromolecules, 2003, vol. 36, pp. 1772 to 1774).

However, regarding the polyester resins polymerized with the use of these new polymerization catalysts, their catalytic chemistry, mechanisms, side reactions, residual catalyst effects, and the like are being vigorously investigated at present. However, the investigation of these is still at the stage of basic research, and how they can be industrially put to practical use, what differences they have, as compared to the resins obtained by the conventional manufacturing method, and what characteristics must be controlled to allow them to be put into practical use are important questions in the industry.

On the other hand, with the current rapid popularization of digitalization technology, the demand of users in general houses, offices, and the publishing region for higher image quality in the outputs, such as prints, copies, and the like, is being increased day by day. Then, in response to the demand for higher image quality, improving the resolution by decreasing the particle diameter, particularly for a toner for use in electrophotography, has been recognized as a technically important approach, and at present, it is aimed that the particle diameter for the toner be reduced down to the order of 5 µm. In this case, using the kneading pulverizing method, which has been conventionally used for toner manufacturing, it is difficult to realize a particle diameter as small as less than 6 µm with the particle size distribution being adequately controlled to maintain the desired characteristics of the electrophotography toner, from the viewpoint of manufacturing energy and cost, and at present, the toner manufacturing method is being shifted to the so-called chemical manufacturing method, such as the suspension polymerization method, the dissolution suspension method, the emulsion polymerization aggregation method, and the like, which are performed in an aqueous medium. Therefore, it is more preferable that the low-temperature fixing resin and the low-temperature polycondensation technology which incorporate the low energy and low environmental load technology as described above be applicable in the aqueous medium, however, with the above-mentioned technology which uses the polycondensation mechanism as the fundamental principle, it has been considered to be difficult to implement direct polymerization in the aqueous medium.

Therefore, when such a resin is to be applied to the toner by the chemical manufacturing method, the technique which carries out polycondensation in advance by the bulk polymerization method, the solution polymerization method, or the like to provide a higher molecular weight, and then dispersion-emulsifies the product into the aqueous medium has generally been taken. In this case, in order to provide an adequate performance for a high-image quality toner, it is required to highly control the particle diameter and the distribution as previously described; however, it is extremely difficult to dispersion-emulsify the resin which has once been provided with an increased molecular weight by bulk polymerization or the like, and the dispersion-emulsification would require use of an organic solvent, or the like, high-temperature heating coalescenc, high shearing energy dispersion, or a classification operation at the final process requiring a large amount of energy. Therefore, it is difficult to make decreasing the energy in the electrophotographic process by using a low temperature fixing resin compatible with the low-energy manufacturing technology for the toner resin indispensable for electrophotographic process power reduction, and even if the amount of energy for the electrophotographic process could be reduced by low temperature fixing, or the like, manufacturing of the resin therefor requires much energy, compared to the conventional resin manufacturing. Thus, when the economics of the total energy required at the stages of material manufacture to the use of the product is considered, it cannot be said that energy reduction has been achieved.

In other words, as regards future challenges for toner manufacture, in order to render low environmental load and low energy technologies in electrophotography, such as low temperature fixing compatible with a toner manufacturing method using a chemical method which is indispensable for responding to the demands of recent years for provision of higher image quality, and the like, in electrophotography, and to achieve ideal compatibility, development of technology which can easily manufacture an aqueous dispersion (dispersion) element of the above-mentioned polycondensed resin is considered to be essential. As a remarkable finding for solving this problem, a literature which reports that polycondensation for a polyester in an aqueous medium, which has been considered to be difficult, is possible can be mentioned (Saam J C, Chou Y J. U.S. Pat. No. 4,355,154; 1982).

However, that technology has a number of ambiguous points in the polymerization mechanism, and with only the technology as disclosed in that literature, it is difficult to obtain a high-molecular weight polymer which meets the requirements for the characteristics of the electrophotographic toner, and to assure the high-image quality characteristics such as the particle size distribution, the charging characteristic, and the like, and thus the technology as disclosed in the same literature is not at a level high enough to be applicable to the sphere of toners.

Therefore, as solutions to the above-mentioned various problems with the low temperature fixing technology, there is the need for a toner for developing electrostatic latent images having an excellent particle size distribution characteristics and charging characteristic, and a manufacturing method therefor; an developer for electrostatic latent images using the toner for developing electrostatic latent images; and an image forming method utilizing the toner for developing electrostatic latent images. In addition, there is the need for a method for manufacturing a dispersion of resin particles to be utilized as a constituent material, and the like, for the toner for developing electrostatic latent images, and more specifically, a dispersion of resin particles with which the polyester surface is satisfactorily coated with a radical polymer, the surface exposure of the polyester being suppressed, while resin particles having a small particle diameter and a sharp particle size distribution can be manufactured, the resin particles being stably emulsified and dispersed.

SUMMARY OF THE INVENTION

The present invention has been made in view of the above circumstances and provides a toner for developing electrostatic latent images, and a manufacturing method thereof; a developer for electrostatic latent images; an image forming method; as well as a method for manufacturing a dispersion of resin particles.

A first aspect of the present invention provides a toner for developing electrostatic latent images, comprising resin particles containing an amorphous polymer and a crystalline polymer, wherein: the amorphous polymer and the crystalline polymer satisfy the relationship represented by the following formula (1).

$$\delta a - \delta c \geqq 1.05 [(cal/ml)^{1/2} (25° C.)] \quad \text{Formula (1)}$$

In formula (1), $\delta a$ represents a solubility parameter of the amorphous polymer, and $\delta c$ represents a solubility parameter of the crystalline polymer.

A second aspect of the present invention provides a method for manufacturing the toner for developing electrostatic latent images according to claim 1, comprising coalescing the crystalline polymer and the amorphous polymer in an aqueous medium to form resin particles; and mixing at least a dispersion of resin particles in which the resin particles are dispersed, and a colorant dispersion in which a colorant is dispersed, aggregating the resin particles and the colorant to a toner particle diameter in the aqueous medium, and heating the obtained aggregate for coalescenc thereof.

A third aspect of the present invention provides a developer for electrostatic latent images comprising a toner and a carrier, wherein the toner is the toner for developing electrostatic latent images of the invention.

A fourth aspect of the present invention provides an image forming method, comprising forming an electrostatic latent image on a latent image-holding member surface; developing the electrostatic latent image formed on the latent image-holding member surface with a developer containing a toner to form a toner image; transferring the toner image formed on the latent image-holding member surface onto a transfer material surface; and heat-fixing the toner image transferred onto the transfer material surface, wherein the toner used is the toner for developing electrostatic latent images of the invention.

A fifth aspect of the present invention provides a method for manufacturing a dispersion of resin particles comprising: emulsifying or dispersing a polycondensable polyester monomer and a radical polymerizable monomer in an aqueous medium, and then carrying out polycondensation and radical polymerization, wherein the absolute value $|\delta v - \delta pe|$ of the difference between a weight-average solubility parameter $\delta pe$ of the whole of the polycondensable polyester monomer and a weight-average solubility parameter $\delta v$ of the whole of the radical polymerizable monomer is 1.05 $[(cal/ml)^{1/2} (25° C.)]$ or more, and a hydrophobic parameter Log(P) of the polycondensable polyester monomer and the radical polymerizable monomer is in a range of −0.5 to 20.

DETAILED DESCRIPTION OF THE INVENTION

The toner for developing electrostatic latent images of the present invention (hereinafter, also referred to as "toner of the present invention") is a toner for developing electrostatic latent images comprising resin particles containing a crystalline polymer and an amorphous polymer, and the amorphous polymer and the crystalline polymer satisfy the relationship represented by the following formula (1).

$$\delta a - \delta c \geq 1.05 [(cal/ml)^{1/2}(25°\,C.)] \quad \text{Formula (1)}$$

In formula (1), $\delta a$ represents a solubility parameter of amorphous polymer, and $\delta c$ represents a solubility parameter of crystalline polymer.

In the present invention, the "crystalline polyester resin" refers to that which has a definite endothermal peak rather than a stepwise change in the endothermal amount in the differential scanning calorimetry (DSC). In addition, a polymer in which some other component is copolymerized to the main chain of the crystalline polyester is also called a crystalline polyester, when the other component is 50 percent by mass or less.

In the toner of the present invention, in order to achieve sufficient low-temperature fixing characteristics, it is necessary that the toner composition include a crystalline component, and in order to improve the charging characteristic and the particle size distribution characteristics without sacrificing the low-temperature fixing characteristics of the crystalline polymer, the toner composition must further include an amorphous polymer material, and the (a) fusion technology (technique) for the crystalline polymer (crystalline polymer material) and the amorphous polymer (amorphous polymer material) is required.

In this case, it is preferable that the compounding ratio between the crystalline polymer material and the amorphous polymer material (the ratio in mass of the crystalline polymer material to the amorphous polymer material) be from 50:50 to 90:10, more preferably 60:40 to 80:20, and still more preferably 70:30 to 75:25.

If the compounding ratio between the crystalline polymer material and amorphous polymer material is within a range of 50:50 to 90:10, the effect that the charging characteristic and the particle size distribution characteristics are bettered without sacrificing the low temperature fixing characteristics is more remarkable.

How the improvement effect of the amorphous polymer can be brought out when a crystalline polymer is contained is a more important point for this art. The charging characteristic of the toner, in particular, mainly depends upon the physical and electrical characteristics on the surface of the toner particle and in the vicinity thereof, and thus how the amorphous polymer material is disposed in the surface layer of the particle and in the vicinity thereof has been an important technical challenge.

In the present invention, resin particles containing the crystalline polymer and the amorphous polymer are fused in an aqueous medium, and then a toner particle comprising the coalesced resin particles is formed. Here, it has been found that, by controlling the difference in affinity to the aqueous medium between the crystalline polymer and the amorphous polymer, i.e., the difference in solubility parameter between the crystalline polymer and the amorphous polymer, to within a specific region, a sufficient charging characteristic for a toner using a crystalline polymer can be obtained, and excellent particle size distribution characteristics can be achieved in manufacture of the toner in the aqueous medium. The reason for this can be considered to be that, by controlling the difference in solubility parameter between the crystalline polymer and the amorphous polymer to within a specific region, the amorphous polymer is caused to be disposed in the surface layer of the resin particle and in the vicinity thereof.

Further, as a method for forming a toner particle comprising resin particles fused in an aqueous medium, a dispersion of resin particles that are at least coalesced is prepared, and aggregation and coalescence are carried out in an aqueous medium. As this method, a method which uses, for example, the emulsion polymerization aggregation method as disclosed in Japanese Patent No. 3107062 can be mentioned.

In the present invention, the difference in solubility parameter between the crystalline polymer and the amorphous polymer is controlled to within a specific region. As the method for calculating the solubility parameter of the crystalline polymer and the amorphous polymer, the present invention has used the method proposed by Fedors et al., which is the most versatile and is in wide spread use, with the usefulness thereof being recognized. This method determines the sum $\Delta e_i$ of the aggregation energy and the sum $\Delta v_i$ of the molecular volumes for the respective unit functional groups to give the solubility parameter from the sum total (R. F. Fedors, Polym. Eng. Sci., 14,147 (1974)).

For the polymers in the present invention, the respective mass fractions are calculated from the combined real quantities of the monomer components used for the polymerization, and assuming that all of the respective polymerization components are incorporated in the polymerization chains at the calculated mass fractions, the solubility parameter of the respective polymerized units that are calculated from the respective monomer component units are obtained, and the sum of these values multiplied by the respective mass fractions is defined as the solubility parameter for the polymer, as shown in the following formula (2). The solubility parameter in the present invention is that at 25° C. as described in, for example, the above-mentioned (R. F. Fedors, Polym. Eng. Sci., 14,147 (1974)).

$$\delta_{overall} = \sum w_i \left(\frac{\Delta e_i}{\Delta v_i}\right)^{1/2} \quad \text{Formula (2)}$$

In formula (2), $\delta_{overall}$ represents a solubility parameter of a polymer $[(cal/ml)^{1/2}\,(25°\,C.)]$; $w_i$ represents a mass fraction calculated from each monomer; $\Delta e_i$ represents the sum of aggregation energy for the respective unit functional groups of the respective monomer components (cal/mol); and $\Delta v_i$ represents the sum of the molecular volumes for the respective unit functional groups $[(ml/mol)^{1/2}\,(25°\,C.)]$.

In the present invention, in order to achieve a sufficient charging characteristic and particle size distribution, it is necessary that the solubility parameter of the amorphous polymer ($\delta a$) is higher than that for the crystalline polymer ($\delta c$) and the difference ($\delta a - \delta c$) is $1.05\,[(cal/ml)^{1/2}\,(25°\,C.)]$ or greater. If the difference is smaller than 1.05, a sufficient charging characteristic and particle size distribution characteristics cannot be obtained. The difference ($\delta a - \delta c$) is preferably 1.1 or more, and more preferably 1.15 or more.

In addition, from the viewpoint of other image qualities such as toner scattering, the difference ($\delta a - \delta c$) is more preferably 1.05 or more. In addition, it is preferably 2.0 or less.

Further, in the toner of the present invention, from the viewpoint of improvement of the low temperature fixing characteristics, the value of melt viscosity at a melting point +20° C. for the crystalline polymer is preferably 10 Pa·S to 10,000 Pa·S, and is more preferably 10 Pa·S to 1000 Pa·S. If the value of melt viscosity at a melting point +20° C. is under 10 Pa·S, the crystalline resin and the amorphous polymer will fully dissolved, and the effect of the sharp melting characteristics possessed by the crystalline resin may not be sufficiently provided. In addition, if the value of melt viscosity at a melting point +20° C. exceeds 10,000 Pa·S, it may become difficult to provide a form of emulsion, and the efficiency of transfer to paper or the like may be lowered.

In the present invention, a dispersion of fused resin particles is prepared, and aggregation and coalescence are carried out in an aqueous medium to manufacture toner particles. In order to manufacture the toner particles, it is preferable to use the emulsion polymerization aggregation method, and it is required to prepare resin particles dispersed in the aqueous medium. In this case, in order to achieve the important characteristic of high-image quality in the final application, the toner center particle diameter is preferably 10 µm or less, and is more preferably 7 µm or less. Further, the volume-average particle size distribution index GSDv for the toner is preferably 1.35 or less, and is more preferably 1.30 or less.

In order to achieve the configuration that of such a preferable toner, the emulsion polymerization aggregation method is optimum. In this case, the average particle diameter of the resin particles, which are one of the toner raw materials in the present invention, is preferably on the order of submicrons, i.e., less than 1 µm. In this case, as mentioned in the description of the existing art, it is extremely difficult to emulsification-disperse the crystalline polymers to be used in the present invention in the aqueous medium simply by use of mechanical shearing, which presents a big problem in terms of manufacturability thereof.

In the present invention, in order to solve this problem, it is preferable that the crystalline polymer is mixed with the radical polymerizable monomer which forms the amorphous polymer by polymerization, and after preparing a mixture, the mixture is emulsification-dispersed into an aqueous medium for polymerization of the radical polymerizable monomer.

Further, it is preferable that the later described mini-emulsion method is used for polymerization after emulsification-dispersing of a mixture of the radical polymerizable monomer and the crystalline polymer into the aqueous medium, in terms of the capability of manufacturing the necessary resin particles with the highest efficiency.

In addition, in order to control the solubility parameter of the amorphous polymer, a radical polymerizable unsaturated acid monomer having a solubility in water of 80 (g/100 g-$H_2O$) or less at 25° C. and/or the anhydride thereof is copolymerized as at least one component thereof. In this case, if a component of which the solubility in water at 25° C. exceeds 80 (g/100 g-$H_2O$) is included, in view of the polymerization mechanism, when polymerization is carried out by the mini-emulsion method, it becomes a water soluble macromolecule rather than one which is supplied for copolymerization in the resin particle, and, thus, it may become difficult for it to be copolymerized as an amorphous polymer in the particle. In addition, if such a water soluble macromolecule is ultimately left adhered to the surface of the toner, the environmental dependency of the charging as a toner is increased, and abnormal charging may be caused, resulting in image quality being greatly impaired. In other words, by defining the solubility in water for such a monomer component, occurrence of a water soluble macromolecule component or oligomer can be suppressed to a minimum.

The solubility in water at 25° C. for the at least one component is preferably 0 to 50 (g/100 g-$H_2O$). In the present invention, the lower the solubility in water, the more preferable, thus the lower limit value is, of course, 0.

In that case, particularly preferable monomers include fumaric acid, maleic acid, maleic anhydride, itaconic acid, itaconic anhydride, and derivatives thereof. These monomers may be used alone or in combination of two or more. Further, it is known that any of the anhydrides of these acids are partly or all hydrolyzed during polymerization to become the acid, and even after the polymerization these acids can be appropriately hydrolyzed with the use of an acid, an alkali, or the like, by well-known techniques.

Hereinbelow, the present invention will be described more detail.

(Crystalline Polymer)

Examples of the crystalline polymer in the resin particles include polyesters, polyamides, polyimides, and the like. Among these, aliphatic polyesters which can be obtained by causing aliphatic diols to react with aliphatic dicarboxylic acids (including acid anhydrides and acid chlorides), and aliphatic polyamides which can be obtained by causing aliphatic diamines to react with aliphatic dicarboxylic acids (including acid anhydrides and acid chlorides) are preferable; and the aliphatic polyesters are particularly preferable.

The crystalline polyester resin is synthesized from a multivalent carboxylic acid component and a polyhydric alcohol component. Examples of the bivalent carboxylic acid component include aliphatic dicarboxylic acids such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like; aromatic dicarboxylic acids such as phthalic acid, isophthalic acid, terephthalic acid, naphthalene-2,6-dicarboxylic acid, malonic acid, dibasic acids such as mesaconic acid, and the like, and the like; and the like, and further, also include, but are not limited thereto, the anhydrides of these and the lower alkyl esters of these. Examples of the trivalent or higher valent carboxylic acid include 1,2,4-benzenetricarboxylic acid, 1,2,5-benzenetricarboxylic acid, 1,2,4-naphthalenetricarboxylic acid, and the like; and the anhydrides of these and the lower alkyl esters of these, and the like. These components may be used alone or in combination of two or more.

In addition, as the acid component, a dicarboxylic acid component having a sulfonic group can be used besides the above-mentioned aliphatic dicarboxylic acids and aromatic dicarboxylic acids. With the present invention, it is preferable that the solubility parameter of the crystalline polymer be minimized, thus it is necessary that the dicarboxylic acid having a sulfonic group be used while taking consideration such that the value of the solubility parameter is as specified, as required, for bettering the dispersibility of the colorant, such as a pigment or the like. Examples of the dicarboxylic acid having a sulfone group include, but are not limited to, 2-sulfoterephthalic acid sodium salt, 5-sulfoisophthalic acid sodium salt, sulfosuccinic acid sodium salt, and the like. Examples also include the lower alkyl esters of these and the anhydrides of these, and the like.

Further, besides the above-mentioned aliphatic dicarboxylic acids and aromatic dicarboxylic acids, a dicarboxylic acid component having a double bond may be contained. The dicarboxylic acid having a double bond can be radically crosslinked through the double bond, thus it can be preferably used in order to prevent hot offset in the fixing. Examples of such a dicarboxylic acid include, but are not limited to, maleic acid, fumaric acid, 3-hexenedioic acid, 3-octenedioic acid, and the like. Examples also include the lower alkyl esters of these, the anhydrides of these, and the like. Among these, fumaric acid, maleic acid, and the like can be mentioned as preferable examples.

As the polyhydric alcohol component, aliphatic diols are preferable, and linear aliphatic diols, the main chain portions of which have 2 to 20 carbons, are more preferable. If the aliphatic diol is of branched type, the crystallinity of the polyester resin is degraded, and the melting point is lowered, and thus the toner blocking resistance, the image preservability, and the low temperature fixability may be deteriorated. In addition, if the number of carbons exceeds 20, it tends to become difficult to acquire a material for practical use. The number of carbons is more preferably 14 or less. Specific examples of the aliphatic diol which is preferably used for synthesizing a crystalline polyester include, but are not limited to, ethyleneglycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, and the like. Examples of the trivalent or higher valent alcohol include glycerin, trimethylolethane, trimethylolpropane, pentaerythritol, and the like. These may be used alone or in combination of two or more.

(Amorphous Polymer)

As the amorphous polymer in the resin particle, non-crystalline polymers derived from polycondensation, polyaddition polymerization, addition polycondensation, addition polymerization, and the like, of polyester resins, and the like, can be used. The most preferable form include non-crystalline polymers derived from radical polymerization of the addition polymerizations.

Examples of the monomer which is subjected to radical polymerization for formation of an amorphous polymer, i.e., the radical polymerizable monomer, include an aromatic vinyl monomer, an acrylic ester monomer, a methacrylic ester monomer, a vinyl ester monomer, a vinyl ether monomer, a monoolefin monomer, a diolefin monomer, a halogenated olefin monomer, and the like.

In addition, a radical-polymerizable monomer having an acidic group or the acid anhydride thereof, or a radical-polymerizable monomer having a basic group, or the acrylate or methacrylate of a polyalkyleneglycol having a hydroxyl group end can also be used. As described above, in the present invention, as the most preferable form, it is preferable to use a radical-polymerizable monomer having an acidic group or the anhydride thereof as at least one component of the copolymerization components. In this case, a monomer of which the solubility in water at 25° C. is 80 (g/100 g-$H_2O$) or lower is preferable. Particularly preferable monomers include fumaric acid, maleic acid, maleic anhydride, itaconic acid, itaconic anhydride, and the derivatives of these.

Examples of the aromatic vinyl monomer include styrene monomers and the derivatives thereof, such as styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, 3,4-dichlorostyrene, and the like.

Examples of the acrylic ester monomer and methacrylic ester monomer include methyl acrylate, ethyl acrylate, butyl acrylate, 2-ethylhexyl acrylate, cyclohexyl acrylate, phenyl acrylate, methyl methacrylate, ethyl methacrylate, butyl methacrylate, hexyl methacrylate, 2-ethylhexyl methacrylate, β-hydroxyethyl acrylate, γ-aminopropyl acrylate, stearyl methacrylate, dimethylaminoethyl methacrylate, diethylaminoethyl methacrylate, and the like.

Examples of the vinyl ester monomer include vinyl acetate, vinyl propionate, vinyl benzoate, and the like. Examples of the vinyl ether monomer include vinyl methyl ether, vinyl ethyl ether, vinyl isobutyl ether, vinyl phenyl ether, and the like. Examples of the monoolefin monomer include ethylene, propylene, isobutylene, 1-butene, 1-pentene, 4-methyl-1-pentene, and the like.

Examples of the diolefin monomer include butadiene, isoprene, chloroprene, and the like. The halogenated olefin monomer include vinyl chloride, vinylidene chloride, vinyl bromide, and the like.

(Resin Particles)

The resin particles containing a crystalline polymer and an amorphous polymer in the present invention are manufactured by a process of preparing the resin particles containing a crystalline polymer and an amorphous polymer in an aqueous medium.

The preparing step is carried out by, for example, emulsification-dispersing previously polycondensed crystalline polymers in the aqueous medium, adding a desired amorphous polymer into the crystalline polymer emulsion, and using the seed polymerization method, the multistage swelling method (Advances in Colloid Polymer Science, 13, 101, 1980), or the like. The important point is that the main polymerization site should be in the crystalline polymer emulsified particles rather than the interior of the micelle as conventional, and the polymerization in the interior of the micelle as conventional should not constitute the main polymerization. Further, a technique which polymerizes the crystalline polymer and the amorphous polymer in advance, then mixes them, and emulsifies them into an aqueous medium can also be used. In these cases, in order to obtain particles having a size on the order of submicrons, i.e., less than 1 µm, a large amount of mechanical and thermal energy is required as described above. Further, the technique which, in order to reduce this energy, mixes an organic solvent into the crystalline and/or amorphous polymer for emulsification dispersion is also applicable.

In the present invention, the most preferable technique for manufacture of resin particles is the mini-emulsion method described below. In this technique, an oil layer (a polymerization layer) comprising at least a radical polymerizable monomer is emulsified in advance to approx. 5 µm or less, preferably to 1 µm or less, and more preferably to 0.7 µm or less, and by using a water soluble or oil-soluble initiator, the radical polymerizable monomer is polymerized to obtain polymer particles. In this case, the polymerization field located in the previously emulsified monomer droplets (the previously emulsified polymerizable monomer emulsion). Further, in recent years, the mini-emulsion method may be subcategorized into the micro-emulsion method, the mini-emulsion method, and the like by the size of the droplets dispersed initially, however, in the present invention, the center particle diameter of the initially emulsified droplets is defined to be 5 µm or less, preferably 1 µm or less, preferably, and more preferably 0.7 µm or less. Hereinbelow, the polymerization method will be described in detail.

First, the crystallized resin (crystalline polymer) and the radical polymerizable monomer for forming the amorphous polymer are mixed. The crystalline resin is melted before being mixed with the polymerizable monomer for forming the amorphous polymer. In this case, both may be fully dissolved into each other, however, the polymer composition must exhibit the desired difference in solubility parameter at the time when the radical polymerization is completed. The combinations of the crystalline resin with the radical polymerizable monomer, and the above-mentioned various amorphous polymers each need not be limited to one type, and a plurality of molecular weights or types of components can be used for combination. In addition, besides the radical polymerizable monomer, additives, such as the chain transfer agent, the crosslinking agent, and the like for controlling the polymerization can also be used. Further, materials constituting the toner (such as the colorant, the releasing agent, and the like) can be mixed at this time. Although a water insoluble solvent, such as toluene, ketone, or the like, can be used in order to further lower the resin viscosity at the time of emulsification, this is not preferable from the viewpoint of environmental load.

The mixture thus obtained is emulsification-dispersed into the aqueous medium. As the method for dispersing into the aqueous medium, the method using shearing, that using collision, that using vibration, and the like can be mentioned. The method using the shearing force is preferable. Specifically, the method using mechanical energy for dispersion is preferable, and as the apparatus to be used therefor, the Ultra-Tarrax, the Clearmix, the Altimizer, the Gaulin homogenizer, the ultrasonic disperser, the planetary ball mill, the microdisperser, the Cavitron, and the like can be mentioned.

In the aqueous medium, an emulsification assistant agent may be used. As the emulsification assistant agent, a surfactant, which lowers the interfacial tension at the surface boundary of the resin for promoting the emulsification, a surfactant assistant, which promotes adsorption of the surfactant, an emulsion stabilizer, which prevents recoalescence of the emulsified particles, and the like can be mentioned.

Examples of the surfactant include anionic surfactants, such as a sulfuric acid ester salt, a sulfonic acid salt, a phosphoric acid ester salt, and the like; cationic surfactants, such as an amine salt type, a quaternary ammonium salt type, and the like; nonionic surfactants, such as a polyethyleneglycol, an alkylphenolethyleneoxide adduct, a polyhydric alcohol, and the like; and the like. Among these, the anionic surfactants and the cationic surfactants are preferable. The nonionic surfactant is preferably used together with the anionic surfactant or the cationic surfactant. The surfactant may be used alone or in combination of two or more.

Examples of the anionic surfactant include sodium dodecylbenzenesulfonate, sodium alkylnaphthalenesulfonate, sodium arylalkylpolyethersulfonate, sodium 3,3-disulfonediphenylurea-4,4-diazo-bis-amino-8-naphthol-6-sulfonate, ortho-carboxybenzene-azo-dimethylaniline, sodium 2,2,5,5-tetramethyl-triphenylmethane-4,4-diazo-bis-β-naphthol-6-sulfonate, sodium dialkylsulfosuccinate, sodium dodecylsulfate, sodium tetradecylsulfate, sodium pentadecylsulfate, sodium octylsulfate, sodium oleate, sodium lauriate, sodium capriate, sodium caprylate, sodium capronate, potassium stearate, calcium oleate, and the like.

Examples of the cationic surfactant include alkylbenzendimethylammonium chloride, alkyltrimethylammonium chloride, distearylammonium chloride, and the like. Examples of the nonionic surfactant include polyethyleneoxide, polypropyleneoxide, a combination of polypropyleneoxide and polyethyleneoxide, an ester of polyethyleneglycol and a higher fatty acid, alkylphenolpolyethyleneoxide, an ester of a higher fatty acid and polyethyleneglycol, an ester of a higher fatty acid and polypropyleneoxide, a sorbitan ester, and the like.

In general, in order to prevent the Ostwald ripening phenomenon from occurring, a higher alcohol, represented by heptanol or octanol, or a higher aliphatic hydrocarbon, represented by hexadecane, is often compounded as a stabilization assistant agent in the mini-emulsion method.

As the emulsion stabilizer, the above-mentioned nonionic surfactant is often used also as an emulsion stabilizer.

For adjustment of the pH of the resin, an acid or an alkali can be used. This pH is preferably in a range of pH 7±2. If the acidity or alkalinity is too high, there is the possibility of the resin being hydrolyzed.

The pH adjuster used here includes a water soluble acid or alkali. Examples thereof include hydrochloric acid, sulfuric acid, nitric acid, acetic acid, perchloric acid, carbonic acid, sodium hydroxide, potassium hydroxide, ammonium hydroxide, calcium hydroxide, magnesium hydroxide, and the like.

Next, the obtained emulsified product is polymerized. Advantages of polymerizing the emulsified product which is emulsification-dispersed into an aqueous medium include that the viscosity of the crystallized resin at the time of emulsification can be lowered; the percentage of the crystalline resin can be increased, as compared to general emulsification-polymerization; an emulsification stability as high as that for the amorphous polymer can be obtained; a uniform latex of a crystallized resin and a radical polymerizable monomer can be manufactured; and the like. In addition, generation of a uniform latex of a crystallized resin and a radical polymerizable monomer has a good effect on the distribution of the crystallized resin and the amorphous polymer in the toner after being passed through the aggregation and coalescence process.

As the polymerization method, any known polymerization method, such as the method which uses a radical polymerization initiator, that which uses UV light irradiation, heat, or the like, or the like, can be adopted. The method which uses a radical polymerization initiator is preferable. The radical polymerization initiator is available as either oil-soluble or water soluble type. Either type of initiator can be used in the invention.

Examples of the radical polymerization initiator include ammonium persulfate, potassium persulfate, sodium persulfate, 2,2'-azobis-(2-methylpropionamide)-dihydrochloride, t-butylperoxy-2-ethylhexanoate, cumyl perpivalate, t-butylperoxylaurate, benzoyl peroxide, lauroyl peroxide, octanoyl peroxide, di-t-butyl peroxide, t-butylcumyl peroxide, dicumyl peroxide, 2,2'-azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), 1,1-bis(t-butylperoxy)3,3,5-trimethylcyclohexane, 1,1-bis(t-butylperoxy)cyclohexane, 1,4-bis(t-butylperoxycarbonyl)cyclohexane, 2,2-bis(t-butylperoxy)octane, n-butyl 4,4-bis(t-butylperoxy)valerate, 2,2-bis(t-butylperoxy)butane, 1,3-bis (t-butylperoxy isopropyl)benzene, 2,5-dimethyl-2,5-di(t-butylperoxy)hexane, 2,5-dimethyl-2,5-di(benzoylperoxy) hexane, di-t-butyldiperoxyisophthalate, 2,2-bis(4,4-di-t-butylperoxycyclohexyl)propane, di-t-butylperoxy α-methylsuccinate, di-t-butylperoxydimethylglutarate, di-t-butylperoxyhexahydroterephthalate, di-t-butylperoxyazelate, 2,5-dimethyl-2,5-di(t-butylperoxy)hexane, diethylene glycol-bis(t-butylperoxycarbonate), di-t-butylperoxytrimethyladipate, tris(t-butylperoxy)triazine, vinyl tris(t-butylperoxy)silane, 2,2'-azobis(2-methylpropionamidine dihydrochloride), 2,2'-azobis[N-(2-carboxyethyl)-2-methylpropionamidine], 4,4'-azobis(4-cyanovaleric acid), and the like.

One preferable embodiment of the resin particles in the present invention provides the resin particles which are obtained by emulsifying or dispersing a polycondensable polyester monomer and a radical polymerizable monomer in the aqueous medium, and then carrying out polycondensation and radical polymerization. In the resin particles, an absolute value $|\delta v - \delta pe|$ of the difference between a weight-average solubility parameter $\delta pe$ of the whole of the polycondensable polyester monomer and a weight-average solubility parameter $\delta v$ of the whole of the radical polymerizable monomer is 1.05 [(cal/ml)$^{1/2}$ (25° C.)] or greater, and a hydrophobic parameter Log(P) for the polycondensable polyester monomer and the radical polymerizable monomer is −0.5 to 20.

Hereinbelow, the method for manufacturing a dispersion of resin particles that contains such resin particles (the method for manufacturing a dispersion of the resin particles of the present invention) will be described in detail.

With the method for manufacturing a dispersion of the resin particles of the present invention, a polycondensable polyester monomer and a radical polymerizable monomer as the raw materials for the purposed resin particles are emulsified or dispersed in the aqueous medium by, for example, mechanical shearing, ultrasonic wave, or the like. At this time, additives, such as a catalyst, a surfactant, and the like, are added into the water soluble medium as required. By applying, for example, heat to this solution, the polycondensation and the radical polymerization are progressed, respectively. The polycondensable polyester monomer used and the radical polymerizable monomer used are those which have a hydrophobic parameter Log(P) of −0.5 to 20, and in addition, the polycondensable polyester monomer used and the radical polymerizable monomer used are those for which the absolute value |$\delta v - \delta pe$| of the difference between the weight-average solubility parameter $\delta pe$ of the whole of the polycondensable polyester monomer and the weight-average solubility parameter $\delta v$ of the whole of the radical polymerizable monomer is 1.05 [(cal/ml)$^{1/2}$ (25° C.)] or greater.

In the method for manufacturing a dispersion of the resin particles of the present invention, resin particles having a small particle diameter and a sharp particle size distribution can be obtained by using the monomers meeting the above-mentioned requirements. The reason for this can be considered to be that the radical polymerizable monomer can be disposed in the surface layer of the resin particle and in the vicinity thereof, which allows the charging characteristic of the surface of the resin particle to be stably controlled.

By using the monomers satisfying the above-mentioned requirements, the radical polymerizable monomer can be disposed in the surface layer of the resin particle and in the vicinity thereof, which allows suppression of the surface exposure of the polyester which is chemically unstable with respect to hydrolysis, and the like, in the aqueous medium, and allows the surface of the resin particle to be covered with the radical polymer, which is relatively stable. Therefore, the dispersion of resin particles that is obtained by the present invention is chemically stable, resulting in the storage stability of the dispersion of resin particles being also improved.

Application of the obtained dispersion of resin particles to the toner for developing electrostatic latent images will provide a toner having excellent toner characteristics. Generally, crystalline or low-molecular weight polyesters are advantageous for low-temperature fixing, whereas they are low in resistance, and as described above, chemically unstable, and thus have had many disadvantages as a resin for toner. However, in the method for manufacturing a dispersion of the resin particles of the present invention, the surface of the polyester is satisfactorily covered with the radical polymerizable monomer, thus the low-temperature fixability is realized; even when a toner requiring a process condition, such as an acidic one, an alkaline one, or the like is manufactured, a stable state is maintained; and a toner which has a good particle size and particle size distribution, and with which the charging characteristic is prevented from being degraded is obtained.

Thus, the method for manufacturing a dispersion of the resin particles of the present invention is applicable as a preferable method for manufacturing a dispersion of resin particles for toner for developing electrostatic latent images.

In the method for manufacturing a dispersion of the resin particles of the present invention, a polycondensable polyester monomer and a radical polymerizable monomer which have a value of hydrophobic parameter, i.e., Log(P) of −0.5 or higher are used. The value of this hydrophobic parameter, i.e., Log(P) is preferably 1.0 or higher, and is more preferably 1.5 or higher. The higher the value of hydrophobic parameter, i.e., Log(P), the more preferable the monomer, however, the upper limit value for a substance which can exist in reality is approx. 20.

In the hydrophobic parameter, i.e., Log(P), the higher the value, the more hydrophobic the monomer, and the hydrophobic parameter is generally expressed by the following formula (the logarithmic value of the distribution coefficient for the monomer into 1-octanol/water).

Formula: $\mathrm{Log}(P) = \mathrm{Log}(C_o/C_w)$

In the Formula, $C_o$ represents a concentration of the monomer in 1-octanol at a measuring temperature, and $C_w$ represents a concentration of the monomer in water at a measuring temperature.

The above-mentioned formula for the hydrophobic parameter Log(P) is quoted from "Atom Typing Scheme" (Journal of Computational Chemistry, Vol. 9, No. 1, pp. 80-90, 1988), which is a computational chemistry method for atomic group contribution by Ghose, Pritchett, Crippen et al.

If the value of Log(P) for the polycondensable polyester monomer and the radical polymerizable monomer is under −0.5, the molecular weight after the polycondensation in the aqueous medium is not sufficient, and the low-molecular weight component is produced in a large quantity, which may result in an unsatisfactory toner characteristics. Then, before emulsifying or dispersing the respective monomers in the aqueous medium, a part or all of the monomer can be addition-polymerized as a preliminary polymerization for formation of a dimer or higher oligomers (formation of a low-molecular weight precursor by bulk-polymerizing or solution-polymerizing the monomer), which can then be emulsified or dispersed into the aqueous medium as the monomer (the starting substance) for polycondensation or radical polymerization. The molecular weight of these oligomers is preferably, for example, 15,000 or less in weight-average molecular weight. The value of Log(P) for the oligomer is defined as that which is weight-average converted from that for the monomer which was used for oligomer polycondensation, and it is required that this value of Log(P) be within the above-mentioned range. By this method, which uses oligomers previously polymerized by bulk polymerization or solution polymerization that have a low molecular weight of 15,000 or less in weight-average molecular weight as the starting substance for polycondensation, a monomer component with a value of Log(P) under −0.5 can be previously copolymerized with other monomers to adjust the value of Log(P) to −0.5 or over, which allows the freedom of the resin particles to be further enhanced.

The absolute value |$\delta v - \delta pe$| of the difference between the solubility parameter $\delta pe$ of the total amount of the polycondensable polyester monomer and the solubility parameter $\delta v$ of the whole of the radically polymerizable monomer is 1.05 [(cal/ml)$^{1/2}$ (25° C.)] or greater. It is preferably 1.05 to 1.3, and is more preferably 1.05 to 1.2. The value of the solubility parameter $\delta v$ of the whole of the radical polymerizable monomer is preferably higher than that of the solubility parameter δpe of the whole of the polycondensable polyester monomer.

This difference of the absolute value indicates the difference in solubility parameter between the respective polymers obtained. In other words, the above-mentioned difference in solubility parameter indicates that the difference in hydrophilicity to the aqueous medium between the polyester and the radical polymer, i.e., the solubility parameter difference between both polymers, is controlled to within a specific region. Thereby, not only resin particles having a small particle diameter and a sharp particle size distribution are obtained, but also it is possible to suppress the surface exposure of the polyester (particularly, a low-resistance resin component, such as a crystalline or low-molecular weight polyester, or the like, which is advantageously used for low-temperature fixing). As a result of this, satisfactory fixing characteristics, charging characteristics, and particle size distribution characteristics as the toner are made possible to be obtained.

Herein, as the method for calculating the solubility parameter, the present invention has take the method proposed by Fedors et al., which is the most versatile and is in widespread use, with the usefulness thereof being recognized, i.e., the method which determines the sum Δei of the aggregation energy and the sum Δvi of the molecular volumes for the respective unit functional groups to give the solubility parameter from the sum total (R. F. Fedors, Polym. Eng. Sci., 14, 147 (1974)). The respective mass fractions have been calculated from the real quantities of compounding of the monomer components in the present invention, and have been used for calculating the solubility parameter of the polymer (the aforementioned formula (2)).

When the solubility parameter (the SP value) is calculated with the above-mentioned formula (2), it is assumed that, in the radical polymerizable monomer (particularly, vinyl monomer), the radical reaction changes the double bond in the main chain into a σ bond; that, with the polycondensable polyester monomer based on a multivalent carboxylic acid and a polyhydric alcohol, the hydration reaction forms a polymer chain; and that the end of the multivalent carboxylic acid is an ester group, and with the polyhydric alcohol, the hydroxyl group is separated from the monomer component. Further, in calculating the value, the number of atoms forming the main chain structure in the respective monomers is taken into account, being assumed to be 6 for an aromatic ring.

The resin particles obtained under such conditions have a core/shell structure, in which the periphery of a core is covered with a shell, the core being made up of a polyester as a result of polycondensation of the polycondensable polyester monomer, and the shell being made up of a radical polymer resulting from radical polymerization of the radical polymerizable monomer. And, as described above, this shell satisfactorily covers the core.

Next, the polycondensable polyester monomer and polycondensation thereof will be described. Examples of the polycondensable polyester monomer include multivalent carboxylic acids of the aliphatic series, cycloaliphatic series, and aromatic series, alkylesters and polyhydric alcohols thereof, ester compounds thereof, and the like, and by using these for carrying out polycondensation by a direct esterification reaction, a transesterification reaction, or the like, polyesters are obtained.

The polyester obtained may take any of the morphologies, such as the amorphous (non-crystalline) polyester, the semi-crystalline resin, the crystalline resin, and the like, or the mixed morphologies thereof. Especially when a toner for low temperature fixing is intended to be obtained, it is preferable to contain at least a crystalline polyester having a melting point in a range of 40° C. to 150° C.

Herein, the melting point of a crystalline resin can be determined as the melting peak temperature in the power compensation type differential scanning calorimetry as defined in JIS K-7121 (Testing methods for transition temperatures of plastics) when measurement is made at a temperature rise rate of 10° C. per min from room temperature to 150° C. by using a differential scanning calorimeter (DSC). Some crystalline resins may exhibit a plurality of melting peaks, however, in the present invention, the maximum peak is regarded as the meting point.

The glass transition point refers to the value determined by the method (DSC method) as defined in ASTM D3418-82.

Whether a resin is crystalline or not can be determined by using a heat absorption curve obtained by the above-mentioned method in accordance with the definition of melting point as given in JIS K-7121. Specifically, a specific resin has been determined to have crystallinity when the temperature difference between the intersection (the melting start point) of a straight line drawn by extending the base line on the lower temperature side toward the higher one with a tangent line drawn at the point providing a maximum slope on the curve on the lower temperature side of the melting peak (heat absorption peak), and the intersection (the melting end point) of a straight line drawn by extending the base line on the higher temperature side toward the lower one with a tangent line drawn at the point providing a maximum slope on the curve on the higher temperature side of the melting peak (heat absorption peak) is 50° C. or less, and the form of the curve shows no stepwise geometry as given in the same JIS K-7121.

Examples of the bivalent carboxylic acid as the above-mentioned monomer component for polymerization of such a crystalline polyester include, but are not limited to, aliphatic dicarboxylic acids, such as adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, 1,18-octadecanedicarboxylic acid, and the like; dibasic acids, such as dicarboxylic acids, such as phthalic acid, isophthalic acid, terephthalic acid, naphthalene-2,6-dicarboxylic acid, and the like; and the like, and further, also include the anhydrides of these, and lower alkyl esters of these.

Examples of the trivalent or higher valent carboxylic acid include 1,2,4-benzenetricarboxylic acid, 1,2,5-benzenetricarboxylic acid, 1,2,4-naphthalenetricarboxylic acid, and the like; and the anhydrides of these, and the like. These may be used alone or in combination of two or more. Further, besides the above-mentioned aliphatic dicarboxylic acids and aromatic dicarboxylic acids, a dicarboxylic acid component having a double bond can be contained. The dicarboxylic acid having a double bond can be radically crosslinked through the double bond, and thus it can be preferably used in order to prevent hot offset in the fixing. Examples of such a dicarboxylic acid include, but are not limited to, maleic acid, fumaric acid, and the like. The lower alkyl esters of these and the anhydrides of these, and the like can also be mentioned. These provide a value of Log(P) of −0.5 or higher when used alone, however, as described above, a monomer other than these that gives a value of Log(P) lower than −0.5 can be used, if it is previously copolymerized with a monomer providing a sufficiently higher value of Log(P) to prepare a derivative having a low molecular weight.

Specific examples of the polyhydric alcohol include, but are not limited to, 1,3-propanediol, 1,4-butanediol, 1,5-pentanediol, 1,6-hexanediol, 1,4-cyclohexanediol, 1,4-cyclohexanedimethanol, 1,7-heptanediol, 1,8-octanediol, 1,9- nonanediol, 1,10-decanediol, 1,11-undecanediol, 1,12-dodecanediol, 1,13-tridecanediol, 1,14-tetradecanediol, 1,18-octadecanediol, 1,14-eicosanedecanediol, ethyleneoxide adducts of bisphenol A, propyleneoxide adducts of bisphenol A, and the like. Examples of the trivalent or higher valent alcohol include trimethylolpropane, and the like.

These may be used alone or in combination of two or more. These provide a value of Log(P) of −0.5 or higher when used alone, however, as described above, a monomer other than these that gives a value of Log(P) lower than −0.5 can be used, if it is previously copolymerized with a monomer providing a sufficiently higher value of Log(P) to prepare a derivative having a low molecular weight.

For polycondensation using these monomers for polyester, a known polycondensation catalyst may be previously compounded in the polyester monomer as required. To achieve polycondensation at a lower temperature, using a Bronsted type polycondensation catalyst or an enzyme catalyst is particularly effective. By adding one type or a plurality of types of these catalysts, for example, in an aqueous medium together with the raw materials at a content of 0.1 to 10,000 ppm, for example, polycondensation can be carried out at a temperature of 150° C. or lower (preferably, 100° C. or lower).

The Bronsted acid type catalyst includes inorganic acids, organic acids, and rare-earth element catalysts. From the viewpoint of the necessity for achieving polycondensation at a lower temperature, a rare-earth element catalyst having a rare-earth element selected from the group consisting of Y, Sc, Yb, and Sm as its composition component is preferably used as the Bronsted acid type catalyst.

The inorganic acid includes sulfuric acid, hydrochloric acid, bromic acid, and the like. Among these, an inorganic acid having a sulfonic group is preferable.

The organic acid includes organic acids having a sulfonic group, such as dodecylbenzenesulfonic acid, polystyrene sulfonate, and styrene copolymers thereof, and the like.

The rare-earth element catalyst, which includes at least one element selected from the group consisting of Y, Sc, Yb, and Sm contained as a composition element, is preferable. And as the preferable catalytic form, the triflate form, trisdodecylsulfate type form, and the like of those elements can be exemplified. Specifically, scandium trisdodecylsulfate can be mentioned, for example.

The enzyme catalyst includes lipase, protease, and cellulase. Examples of these include those derived from *Pseudomonas fluorescens*, those derived from *Pseudomonas cepasia*, those derived from Porcine pancreas, those derived from *Candida rugosa*, those derived from *Aspergillus niger*, those derived from *Rhizopus delemer*, those derived from *Rhizopus japonicus*, and the like.

These catalysts may be used alone, but a plurality of types of these may be used as required. In addition, it is preferable that, in consideration of the catalyst being distributed into the polyester emulsion or the particles and aqueous medium during polymerization, the catalyst compound having a higher hydrophobicity or molecular weight, or a surfactant type catalyst be selected, from the viewpoint of the quantity of use of the catalyst, and the surfactant type catalyst is particularly preferable. For example, scandium trisdodecylsulfate can be preferably mentioned.

Herein, the surfactant type catalyst, i.e., a catalyst having a surface activity refers to a catalyst which has a chemical structure consisting of a hydrophobic group and a hydrophilic group. Generally, a catalyst tends to migrate into the water, however, the surfactant type catalyst tends to be adsorbed to the surface of the resin particle, and to participate in the polymerization reaction in the oil phase, and thus it can more effectively promote the polymerization reaction.

These catalysts can also be recovered to be reused, as required.

Next, the radical polymerizable monomer, and the radical polymerization thereof will be described. The radical polymerizable monomer is finally polymerized by the radical polymerization to provide hybrid particles of a polyester and a radical polymerized polymer. As the radical polymerizable monomer used here to provide a radical polymerized polymer, an aromatic vinyl monomer, a (meth)acrylic ester monomer, a vinyl ester monomer, a vinyl ether monomer, a monoolefin monomer, a diolefin monomer, a halogenated olefin monomer, and the like can be mentioned.

Examples of the aromatic vinyl monomer include styrene monomers and derivatives thereof, such as styrene, o-methylstyrene, m-methylstyrene, p-methylstyrene, p-methoxystyrene, p-phenylstyrene, p-chlorostyrene, p-ethylstyrene, p-n-butylstyrene, p-tert-butylstyrene, p-n-hexylstyrene, p-n-octylstyrene, p-n-nonylstyrene, p-n-decylstyrene, p-n-dodecylstyrene, 2,4-dimethylstyrene, 3,4-dichlorostyrene, and the like. Examples of the (meth)acrylic ester monomer include methyl acrylate, ethyl acrylate, butyl acrylate, 2-ethylhexyl acryl ate, cyclohexyl acryl ate, phenyl acrylate, methyl methacrylate, ethyl methacrylate, butyl methacrylate, hexyl methacrylate, 2-ethylhexyl methacrylate, β-hydroxyethyl acrylate, γ-aminopropyl acrylate, stearyl methacrylate, dimethylaminoethyl methacrylate, diethylaminoethyl methacrylate, and the like. Examples of the vinyl ester monomer include vinyl acetate, vinyl propionate; vinyl benzoate, and the like. Examples of the vinyl ether monomer include vinyl methyl ether, vinyl ethyl ether, vinyl isobutyl ether, vinyl phenyl ether, and the like. Examples of the monoolefin monomer include ethylene, propylene, isobutylene, 1-butene, 1-pentene, 4-methyl-1-pentene, and the like. Examples of the diolefin monomer include butadiene, isoprene, chloroprene, and the like. Examples of the halogenated olefin monomer include vinyl chloride, vinylidene chloride, vinyl bromide, and the like.

Among these monomers, the vinyl monomer is the most preferable. Further, in order to control the solubility parameter of the whole of the radical polymerizable monomer (the radical polymer), it is preferable that, together with the vinyl monomer, a radical polymerizable unsaturated acid monomer having a solubility in water of 80% (at 25° C.) or less or the acid anhydride thereof be used, in other words, be copolymerized with the vinyl monomer. Examples of the unsaturated acid monomer include acrylic acid, methacrylic acid, fumaric acid, maleic acid, maleic anhydride, itaconic acid, itaconic anhydride, and derivatives of these, and these can be used alone or in combination of two or more. Further, it is known that any of the anhydrides of these acids is partly or all hydrolyzed during polymerization to become the acid, and even after the polymerization, can be appropriately hydrolyzed with the use of an acid, an alkali, or the like, by a well-known technique.

As the method for polymerizing these radical polymerizable monomers, any known polymerization method, such as the method which uses a radical polymerization initiator, the self-polymerization method by heat, the method which uses UV light irradiation, or the like can be adopted. The radical polymerization initiator to be used for the method which uses a radical polymerization initiator is available an either oil-soluble or water soluble type, however, either type of initiator can be used.

Hereinbelow, the method for manufacturing the dispersion of toner particles of the present invention will be described in more detail. The particle diameter of the toner particles obtained is preferably 10 µm or less in volume-average particle diameter, and is more preferably 7 µm or less, and the most preferable particle diameter is 0.2 µm to 1 µm. A particle diameter over 10 µm is not preferable in view of the image quality characteristics, such as the resolution, and the like, which would be provided by the toner manufactured. Further, if the particle diameter is over 10 µm, the amount and rate of increase in the molecular weight in polycondensation are not satisfactory, which presents a manufacturing problem, and a problem of image quality after fixing.

In order to obtain polycondensed resin particles having such a prescribed particle diameter in the aqueous medium, it is preferable to adopt, as the polymerization method, a method utilizing the non-uniform system polymerization form in the ordinary aqueous medium, such as the suspension polymerization method, the dissolution suspension method, the mini-emulsion method, the micro-emulsion method, the multistage swelling method, the emulsification-polymerization method including seed polymerization, and the like. In addition, in this case, because the polycondensation reaction, and particularly the final molecular weight and the polymerization rate depend upon the final particle diameter of the particles, as described above, it is more preferable to adopt the mini-emulsion method, the micro-emulsion method, or the like, as a polymerization method which provides particles on the order of submicrons, i.e., less than 1 µm, as the final manufacturing form allowing the particle size less than 1 µm, the most preferable particle diameter, and more efficient manufacturing to be achieved.

In the present invention, the above-mentioned respective materials are emulsified or dispersed into the aqueous medium by using mechanical shearing, ultrasonic wave, or the like. In the invention, the monomer may be directly emulsification-dispersed, or after forming a low-molecular weight precursor by bulk-polymerizing or solution-polymerizing the monomer, the precursor may be emulsified or dispersed. At the time of such emulsification-dispersion, it is preferable that the polycondensable polyester monomer be previously dissolved into the polycondensable monomer, which is then followed by emulsifying or dispersing the solution into the aqueous medium. Thereby, the emulsification-dispersion and the polycondensation reaction can be carried out more easily. In this emulsification-dispersion, a surfactant, a polymer dispersing agent, an inorganic dispersing agent, or the like can be added into the aqueous medium, as required.

Examples of the surfactant to be used here include anionic surfactants, such as a sulfuric acid ester salt, a sulfonic acid salt, a phosphoric acid ester salt, and the like; cationic surfactants, such as an amine salt type, a quaternary ammonium salt type, and the like; nonionic surfactants, such as a polyethyleneglycol, an alkylphenolethyleneoxide adduct, a polyhydric alcohol, and the like; and the like. Among these, the anionic surfactants and the cationic surfactants are preferable. The nonionic surfactant is preferably used together with the anionic surfactant or the cationic surfactant. The surfactant may be used alone or in combination of two or more. Examples of the anionic surfactant include sodium dodecylbenzenesulfonate, sodium alkylnaphthalenesulfonate, sodium arylalkylpolyethersulfonate, sodium 3,3-disulfonediphenylurea-4,4-diazo-bis-amino-8-naphthol-6-sulfonate, ortho-carboxybenzene-azo-dimethylaniline, sodium 2,2,5,5-tetramethyl-triphenylmethane-4,4-diazo-bis-β-naphthol-6-sulfonate, sodium dialkylsulfosuccinate, sodium dodecylsulfate, sodium tetradecylsulfate, sodium pentadecylsulfate, sodium octylsulfate, sodium oleate, sodium laurate, sodium caprate, sodium caprylate, sodium capronate, potassium stearate, calcium oleate, and the like. Examples of the cationic surfactant include alkylbenzendimethylammonium chloride, alkyltrimethylammonium chloride, distearylammonium chloride, and the like. Examples of the nonionic surfactant include polyethyleneoxide, polypropyleneoxide, a combination of polypropyleneoxide and polyethyleneoxide, an ester of polyethyleneglycol and a higher fatty acid, alkylphenolpolyethyleneoxide, an ester of a higher fatty acid and polyethyleneglycol, an ester of a higher fatty acid and polypropyleneoxide, a sorbitan ester, and the like. In addition, as the macromolecular dispersing agent, sodium polycarboxylate and polyvinylalcohol can be exemplified, and as the inorganic dispersing agent, calcium carbonate, and the like can be exemplified, however, these do not limit the present invention in any way. In addition, in order to prevent the Ostwald ripening phenomenon for the monomer emulsion particles in the ordinary aqueous medium from occurring, a higher alcohol, represented by heptanol or octanol, or a higher aliphatic hydrocarbon, represented by hexadecane, can often be compounded as a stabilization assistant agent.

In the present invention, besides the above-mentioned dispersion of resin particles of the present invention, addition polymerization-based dispersions of resin particles that are manufactured by using the conventionally known emulsification-polymerization method, or the like, can also be used.

Examples of the addition polymerization monomer for manufacturing these dispersions of resin particles include styrenes, such as styrene, parachlorstyrene, and the like; vinyl esters, such as vinylnaphthalene, vinyl chloride, vinyl bromide, vinyl fluoride, vinyl acetate, vinyl propionate, vinyl benzoate, vinyl butyrate, and the like; methylene aliphatic carboxylic acid esters, such as methyl acrylate, ethyl acrylate, n-butyl acrylate, isobutyl acrylate, dodecyl acrylate, n-octyl acrylate, 2-chlorethyl acrylate, phenyl acrylate, methyl α-chloracrylate, methyl methacrylate, ethyl methacrylate, butyl methacrylate, and the like; acrylonitrile, methacrylonitrile, acrylamide, vinyl ethers, such as vinyl methyl ether, vinyl ethyl ether, vinyl isobutyl ether, and the like; monomers having an N-polarity-having group, such as N-vinyl compounds and the like, such as N-vinylpyrrole, N-vinylcarbazole, N-vinylindole, N-vinylpyrrolidone, and the like; homopolymers and copolymers of vinyl monomers, such as vinyl carboxylic acids, such as methacrylic acid, acrylic acid, cinnamic acid, carboxyethyl acrylate, and the like; and the like, and further a variety of waxes can also be used.

When the addition polymerization monomers are used, a dispersion of resin particles is manufactured by carrying out emulsification-polymerization in which an ionic surfactant or the like is used. For other types of resin, if the resin used is one which is to be dissolved into a solvent and is oil-based and has a relatively low solubility in water, the resin is dissolved into such a solvent, and dispersed into the aqueous medium together with an ionic surfactant or a polymer electrolyte by means of a disperser, such as a homogenizer; and then by heating and evacuating the solution for evaporation of the solvent, a dispersion of resin particles can be obtained.

Next, the method for manufacturing the toner for developing electrostatic latent images of the present invention (hereinafter, optionally referred to as "method for manufacturing the toner of the present invention") will be described in detail.

The toner of the present invention is obtained by at least aggregating a dispersion of resin particles (the aggregation step), and then heating-coalescing (the coalescence step).

More specifically, the method for manufacturing the toner of the present invention includes a step for forming resin particles by coalescing the crystalline polymer and amorphous polymer in the aqueous medium, a step for mixing at least the dispersion of resin particles in which the coalesced resin particles are dispersed, with a colorant dispersion in which a colorant is dispersed, and aggregating the resin particles and the colorant in the aqueous medium to the toner particle diameter (the aggregation step), and a step for heating and coalescing the aggregate obtained (the coalescence step).

In order to manufacture the toner of the present invention, it is preferable to use the emulsion polymerization aggregation method, and to prepare resin particles dispersed in the aqueous medium.

As described above, in the present invention, it is preferable to use the resin particles which are obtained by emulsifying or dispersing a polycondensable polyester monomer and a radical polymerizable monomer in the aqueous medium, and then carrying out polycondensation and radical polymerization, and for which the absolute value $|\delta v - \delta pe|$ of the difference between the weight-average solubility parameter $\delta pe$ of the whole of the polycondensable polyester monomer and the weight-average solubility parameter $\delta v$ of the whole of the radical polymerizable monomer is 1.05 $[(cal/ml)^{1/2}$ (25° C.)] or greater, and the hydrophobic parameter Log(P) for the polycondensable polyester monomer and the radical polymerizable monomer is −0.5 to 20.

The toner of the present invention is obtained by, for example, mixing a dispersion of resin particles containing the above-mentioned resin particles with a dispersion of colorant particles and a dispersion of releasing agent particles; using an ionic surfactant having the polarity opposite to that of the ionic surfactant to cause a hetero aggregation for formation of aggregated particles having the toner diameter; then causing the aggregated particles to be fused and coalesced by heating them to a temperature above the glass transition point for the resin particles; and cleaning and drying them.

The shape of the toner used ranges from an amorphous one to a spherical one.

The dispersion of resin particles used in the aggregation step is prepared in an aqueous medium, thus can be utilized as a dispersion of resin particles as they are, and by mixing this dispersion of resin particles with a dispersion of colorant particles and a dispersion of releasing agent particles, as required, and further adding an aggregation agent for causing these particles to be hetero-aggregated, aggregated particles of the toner diameter can be formed. In addition, after carrying out such an aggregation to form a first aggregated particle, the above-mentioned dispersion of resin particles of the present invention or another dispersion of resin particles can be further added to form a second shell layer on the surface of the first particle. In this exemplification, the colorant dispersion is separately prepared, however, when a colorant dispersion is previously compounded into the polycondensed resin particles, there is no need for separate preparation of the colorant dispersion.

In the aggregation step, the initial stage, where the dispersion of resin particles, the dispersion of colorant particles, and the dispersion of releasing agent particles are mixed with one another, may involve previously shifting the balance in amount between the ionic dispersing agents of the respective polarities; adding an inorganic metallic salt polymer, such as polyaluminum chloride, or the like, for ionic neutralization; thereafter, forming matrix aggregated particles for the first stage at a temperature below the glass transition point; then, after they have been stabilized, adding a dispersion of resin particles treated with an ionic dispersing agent of such a polarity and amount as to compensate for the shift in ionic balance as a second stage; further, as required, slightly heating the solution at a temperature below the glass transition point for the resin contained in the resin particles and the added resin particles in the aggregated particles for stabilization at a higher temperature; and then heating the solution at a temperature above the glass transition point for causing the particles added at the second stage of the aggregate formation to be coalesced with the matrix aggregated particles, being left adhered to the surface thereof. Further, this stepwise operation for aggregation may be repeatedly carried out several times. This two-stage method is effective for improving the degree of encapsulation of the releasing agent and the colorant.

The colorant to be used in the dispersion of colorant particles is not particularly limited, provided that it is well known. Preferable examples thereof include carbon black, such as furnace black, channel black, acetylene black, thermal black, and the like; inorganic pigments, such as red oxide, Prussian blue, titanium oxide, and the like; azo pigments, such as fast yellow, disazo yellow, pyrazolone red, chelate red, brilliant carmine, parabrown, and the like; phthalocyanine pigments, such as copper phthalocyanine, non-metallic phthalocyanine, and the like; and condensed polycyclic pigments, such as flavanthrone yellow, dibromoanthrone orange, perylene red, quinacridone red, dioxazine violet, and the like. In addition, other preferable examples include various pigments, such as chrome yellow, Hansa yellow, benzidine yellow, threne yellow, quinoline yellow, permanent orange GTR, pyrazolone orange, Balcan orange, watchung red, permanent red, Dupont oil red, lithol red, rhodamine B lake, lake red C, rose Bengal, aniline blue, ultramarine blue, Calco oil blue, methylene blue chloride, phthalocyanine blue, phthalocyanine green, malachite green oxalate, pigment red 48:1, CI pigment red 122, CI pigment red 57:1, CI pigment yellow 12, CI pigment yellow 97, CI pigment yellow 17, CI pigment blue 15:1, CI pigment blue 15:3, and the like; and the like. The colorant may be used alone or in combination of two or more.

The pigments which can be used as a colorant in the present invention will be described in more detail.

Examples of the black pigment include carbon black, copper oxide, manganese dioxide, aniline black, activated carbon, nonmagnetic ferrite, magnetite, and the like.

Examples of the yellow pigment include chrome yellow, zinc yellow, yellow iron oxide, cadmium yellow, chrome yellow, Hansa yellow, Hansa yellow 10G, benzidine yellow G, benzidine yellow GR, threne yellow, quinoline yellow, permanent yellow NCC, and the like.

Examples of the orange pigment include orange chrome yellow, molybdenum orange, permanent orange GTR, pyrazolone orange, Balcan orange, benzidine orange G, induthrene brilliant orange RK, induthrene brilliant orange GK, and the like.

Examples of the red pigment include red oxide, cadmium red, red lead, red mercury sulfide, watchung red, permanent red 4R, lithol red, brilliant carmine 3B, brilliant carmine 6B, Dupont oil red, pyrazolone red, rhodamine B lake, lake red C, rose Bengal, eoxine red, alizarin lake, and the like.

Examples of the blue pigment include Prussian blue, cobalt blue, alkali blue lake, Victoria blue lake, fast sky blue, induthrene blue BC, aniline blue, ultramarine blue, Calco oil blue, methylene blue chloride, phthalocyanine blue, phthalocyanine green, malachite green oxalorate, and the like.

Examples of the purple pigment include manganese purple, fast violet B, methyl violet lake, and the like.

Examples of the green pigment include chrome oxide, chrome green, pigment green, malachite green lake, final yellow green G, and the like.

Examples of the white pigment include Chinese white, titanium oxide, antimony white, zinc sulfide, and the like.

Examples of the loading pigment include Baryte powder, barium carbonate, clay, silica, white carbon, talc, alumina white, and the like.

Further, examples of the dyestuff include various dyestuffs, such as basic, acidic, dispersion, substantive dyestuff, and the like, such as nigrosine, methylene blue, rose Bengal, quinoline yellow, ultramarine blue, and the like.

These colorants are used alone or in mixture. With these colorants, a dispersion of colorant particles can be prepared by using, for example, a media type dispersing machine, such as a rotary shearing type homogenizer, a ball mill, a sand mill, an attriter, or the like, or a high-pressure opposing collision type dispersing machine, or the like. In addition, these colorants can also be dispersed into an aqueous medium by using a surfactant having a polarity and a homogenizer.

The colorant is selected from the viewpoints of hue angle, saturation, lightness, weathering resistance, OHP permeability, and dispersibility in toner.

The colorant can be added in the range of 4 to 15 percent by mass of the total mass of the solid content constituting the toner. When a magnetic substance is used as the black colorant, 12 to 240 percent by mass can be added unlike the other colorants.

The amount of admixture of the colorant is the amount which is required to assure the color development capability in fixing. In addition, by providing the colorant particles in the toner with a center diameter (median diameter) of 100 to 330 nm, the OHP permeability and the color development capability can be assured.

The center diameter (median diameter) of the colorant particles was measured by using, for example, a laser diffraction type particle size distribution measuring apparatus (LA-920, manufactured by HORIBA, ltd.).

The releasing agent to be used is not particularly limited, provided that it is well known. Preferable examples thereof include various ester waxes; low-molecular weight polyolefins, such as polyethylene, polypropylene, polybutene, and the like; silicones exhibiting a softening point when subjected to heating; fatty acid amides, such as oleic acid amide, erucic acid amide, ricinoleic acid amide, stearic acid amide, and the like; vegetable waxes, such as carnauba wax, rice wax, candelilla wax, Japan wax, jojoba oil, and the like; animal waxes, such as beeswax; mineral/petroleum waxes, such as Montan wax, ozokerite, ceresine, paraffin wax, microcrystalline wax, Fischer-Tropsch wax, and the like; and modifications thereof, and the like.

These waxes will hardly at all be dissolved into a solvent, such as toluene, at near room temperature, or if they are dissolved, only a very small amount is dissolved.

With any of these waxes, a dispersion of particles of 1 µm or smaller can be manufactured by dispersing it together with an ionic surfactant and a macromolecular electrolyte, such as a macromolecular acid, a macromolecular base, or the like, in an aqueous medium, heating the solution to above the melting point of the pertinent wax, and particulately dispersing it by the use of a homogenizer with a strong shearing force-giving capability or a high-pressure discharge type dispersing machine (Gaulin Homogenizer, manufactured by Gaulin, Inc.).

The releasing agent is preferably added in the range of 5 to 25 percent by mass of the total mass of the solid content constituting the toner in view of the necessity for assuring the peelability of the fixed image in an oilless fixing system.

The particle diameter of the dispersion of releasing agent particles was measured by using, for example, a laser diffraction type particle size distribution measuring apparatus (LA-920, manufactured by HORIBA, Ltd.). When the releasing agent is to be used, it is preferable that the aggregation of the resin particles, the colorant particles, and the releasing agent particles be followed by further adding the dispersion of resin particles for causing resin particles to be adhered to the surface of the aggregated particles, from the viewpoint of assurance of charging characteristic and durability.

The releasing agents may be used alone or in combination of two or more.

The melting point of the releasing agent is preferably 50° C. or higher, and is more preferably 60° C. or higher, from the viewpoint of toner shelflife. Further, from the viewpoint of offset resistance, the melting point of the releasing agent is preferably 110° C. or lower, and is more preferably 100° C. or lower.

In addition to the above-mentioned types of admixture, various other substances, such as an internal additive, a charge controlling agent, an inorganic particulate matter (inorganic particles), organic particles, and the like may be added as components, as required.

Examples of the internal additive include a magnetic substance, such as a metal or alloy, such as ferrite, magnetite, reduced iron, cobalt, nickel, manganese, or the like, or a compound comprising such a metal, and the like.

Examples of the charge controlling agent include a quaternary ammonium chloride compound, a nigrosine compound, a dyestuff consisting of a complex of aluminum, iron, chromium, or the like, a triphenylmethane pigment, and the like. From the viewpoints of control of the ionic strength which can have an effect on the stability in aggregation and coalescence, and reduction of waste water contamination, a material which is poorly soluble in water is preferable.

The inorganic particulate matter is added mainly for the purpose of adjusting the viscoelasticity of the toner, and examples thereof include particles of silica, alumina, titania, calcium carbonate, magnesium carbonate, calcium phosphate, cerium oxide, and any other inorganic particles which are generally used as an external additive to the toner, as those listed in detail hereinbelow.

As the aggregation agent, a bi- or higher valent metallic complex can be preferably used in addition to the surfactant having an opposite polarity to that of the surfactant used in the dispersion, and the inorganic metallic salt. Examples of the inorganic metallic salt include metallic salts, such as calcium chloride, calcium nitrate, barium chloride, magnesium chloride, zinc chloride, aluminum chloride, aluminum sulfate, and the like; and inorganic metallic salt polymers, such as polyaluminum chloride, polyaluminum hydroxide, calcium polysulfide, and the like. Among these, the aluminum salts and the polymers thereof are preferable. In order to obtain a sharper particle size distribution, an inorganic metallic salt having a valence of 2 is more preferable than that with a valence of 1, likewise, that with a valence of 3 is more preferable than that with 2, likewise, that with 4 is more preferable than that with 3, and for a given valence, an inorganic metallic salt polymer of polymerization type is more preferable.

The surfactant can be used for such a purpose as emulsification-polymerization of a resin, dispersion of a pigment, dispersion of resin particles, dispersion of a releasing agent, aggregation, stabilization of aggregated particles, and the like. Specifically, anionic surfactants, such as sulfuric acid ester salts, sulfonic acid ester salts, phosphoric acid ester salts, soaps, and the like; cationic surfactants, such as amine salts, quaternary ammonium salts, and the like; and nonionic surfactants, such as polyethyleneglycols, alkylphenolethyleneoxide adducts, polyhydric alcohols, and the like; are effectively used in conjunction. As the dispersion means, a general one such as a rotary shearing type homogenizer, a ball mill with media, a sand mill, Dynomill, or the like can be used.

After passing through the aggregation step, the aggregated particles are heated to a temperature above the glass transition point or melting point of the resin particles in the coalescence process (the coalescence step) for coalescing the aggregated particles, and by cleaning and drying the product, as required, the toner can be obtained.

In the coalescence step, while stirring in the same manner as in the aggregation step, the pH of the suspension of the adhered aggregated particles is caused to be in a range of 6.5 to 8.5 to stop the progress of the aggregation, and then the solution is heated at a temperature above the glass transition point of the binder resin for coalescing the adhered aggregated particles. The heating temperature at the time of coalescence may be optional, provided that it is above the glass transition point for the binder resin contained in the aggregated particle. A guide to the time for the heating is about 0.5 to 1.5 hour for smoothing the surface of the aggregated particles by coalescence. If the heating time is too long, the crystalline polyester contained in the core aggregated particle tends to be exposed on the toner surface. This is effective for fixability and document shelflife, but has an ill effect on the charging characteristic, thus exposure of the crystalline polyester on the toner surface is not preferable.

The fused particles obtained by coalescence can be rendered as toner particles through as solid-liquid separation step involving filtration or the like, and as required, a cleaning step and a drying step. In this case, in order to assure a sufficient charging characteristic and reliability as a toner, it is preferable to sufficiently clean the fused particles with deionized water in the cleaning step. The solid-liquid separation step is not particularly limited, but it is preferable to use suction filtration, pressurized filtration, or the like, from the viewpoint of productivity.

For the drying step, any method, such as the ordinary vibration type fluidized drying method, the spray drying method, the freeze drying method, the flash jet drying method, the fluidized drying method, the vibration type fluidized drying method, or the like may be adopted. For the toner particles, it is preferable to adjust the water content after drying to 1.0% or less, and preferably to 0.5% or less.

The adequate range of cumulative volume-average particle diameter $D_{50}$ for the toner is 3.0 to 9.0 μm, and is preferably 3.0 to 5.0 μm. If the value of $D_{50}$ is under 3.0 μm, the adhesive force may be increased, and the developability be lowered. On the other hand, if the value of $D_{50}$ exceeds 9.0 μm, the resolution of the image may be lowered.

In addition, the volume-average particle size distribution index GSDv for the toner obtained is preferably 1.30 or less. If the GSDv is over 1.30, the resolution of the image may be lowered, and may cause such an image defect as scattered toner, fog, or the like.

Herein, for the cumulative volume-average particle diameter $D_{50}$ and the average particle size distribution index, a cumulative volume distribution curve and a cumulative number distribution curve are drawn from the side of the smaller particle size, respectively, for each particle size range (channel) as a result of division of the particle size distribution measured by using a measuring instrument, for example, a Coulter Counter TAII (manufactured by Beckmann Coulter), a Multisizer II (manufactured by Beckmann Coulter), or the like, and the particle diameter providing 16% cumulative is defined as volume $D_{16v}$ and number $D_{16p}$; that providing 50% cumulative being defined as volume $D_{50v}$ and number $D_{50p}$; and that providing 84% cumulative being defined as volume $D_{84v}$ and number $D_{84p}$. Using these values, the volume-average particle size distribution index GSDv is calculated as $(D_{84v}/D_{16v})^{1/2}$, and the number-average particle size distribution index GSDp is calculated as $(D_{84p}/D_{16p})^{1/2}$.

The range of shape factor SF1 for the toner obtained is 100 to 140, and is preferably 110 to 135, from the viewpoint of image formability. The shape factor SF1 can be determined as follows. First, the optical microscope image of the toner particles scattered on a slide glass was taken into a Luzex image analyzing apparatus through a video camera, and for 50 or more toner particles, the circumferential length (ML) and the projected area (A) were measured to determine the shape factor SF1 for the toner by the formula: $SF1 = ML^2/A \times \pi/4 \times 100$.

To the toner particles produced through the drying step as described above, various well known external additives, such as the inorganic particles, organic particles, and the like, as mentioned above, can be added as other components in accordance with the purpose.

Examples of the inorganic particles as an external additive include particles made of silica, alumina, titanium oxide, barium titanate, magnesium titanate, calcium titanate, strontium titanate, zinc oxide, silica sand, clay, mica, wollastonite, diatomaceous earth, cerium chloride, red oxide, chrome oxide, cerium oxide, antimony trioxide, magnesium oxide, zirconium oxide, silicon carbide, silicon nitride, and the like. Among them, silica particles and titanium oxide particles are preferable, and inorganic particles subjected to a treatment for hydrophobicization are particularly preferable. Inorganic particles are generally used for the purpose of improving the fluidity. Organic particles are generally used for the purpose of improving the cleanability and transferability, and specific examples include polystyrene, polymethyl methacrylate, polyvinylidene fluoride, and the like.

When inorganic substance particles are to be adhered to the surface of the toner particles in an aqueous medium, any of the particles, such as those of silica, alumina, titania, calcium carbonate, magnesium carbonate, calcium triphosphate, and the like, which are generally used as an external additive to the toner, can be applied by dispersing them with an ionic surfactant and a macromolecular acid, or a macromolecular base.

Specifically, the primary particle diameter of the inorganic substance particle is 5 μm to 2 μm, and is preferably 5 μm to 500 μm. The specific surface area measured by the BET method is preferably 20 to 500 m²/g. The percentage of the inorganic particles to be mixed in the toner is 0.01 to 5 percent by weight, and is preferably 0.01 to 2.0 percent by weight. Examples of such an inorganic fine powder include fine powders made of silica, alumina, titanium oxide, barium titanate, magnesium titanate, calcium titanate, strontium titanate, zinc oxide, silica sand, clay, mica, wollastonite, diatomaceous earth, chrome oxide, cerium oxide, red oxide, antimony trioxide, magnesium oxide, zirconium oxide, barium sulfate, barium carbonate, calcium carbonate, silicon carbide, silicon nitride, and the like. Among them, silica powder is particularly preferable.

The silica powder mentioned herein is a powder having a Si—O—Si bond, and any of the fine powders manufactured by the dry method and the wet method are included in this category. In addition, the silica fine powder may contain any of aluminum silicate, sodium silicate, potassium silicate, magnesium silicate, zinc silicate, and the like in addition to silicon dioxide anhydride, but preferably contains $SiO_2$ by 85 percent by mass or higher.

Specific examples of the silica powder include various commercially available fine silica powders, however, those which have a hydrophobic group on the surface are preferable, and examples thereof include AEROSIL R-972, R-974, R-805, and R-812 (manufactured by NIPPON AEROSIL CO., LTD.), and the like. Other fine silica powders which can be used include those which are treated with a silane coupling agent, a titanium coupling agent, a silicon oil, or a silicon oil having an amine at the side chain, and the like.

When the toner of the present invention is to be used as a magnetic toner, it may contain a magnetic powder in the binder resin. As such a magnetic powder, a substance which is magnetized in the magnetic field is used. Specifically, powder of a ferromagnetic substance, such as iron, cobalt, nickel, or the like, or a compound, such as ferrite, magnetite, or the like, can be used. Particularly, in the present invention, since the toner is obtained in the aqueous layer, it is necessary to pay attention to the aqueous layer migration of the magnetic substance, and it is preferable that surface modification, such as hydrophobic treatment, or the like, be previously provided.

<Developer for Electrostatic Latent Images>

The developer for electrostatic latent images of the present invention is an electrostatic latent image developer comprising a toner and a carrier, in which the toner is the above-mentioned toner for developing electrostatic latent images of the invention. The above-mentioned toner for developing electrostatic latent images of the present invention may be used as a one-component developer as it is, however, it may also be used as a two-component developer. When it is to be used as a two-component developer, it is used as a mixture of the toner of the present invention and the carrier.

The carrier which can be used in the two-component developer is not particularly limited, and any well-known carrier can be used. Examples thereof include magnetic metals, such as iron oxide, nickel, cobalt, and the like; magnetic oxides, such as ferrite, magnetite, and the like; resin coated carriers which have a resin coating layer on the surface of these core materials; magnetic dispersion type carriers; and the like. In addition, the carrier may be a resin dispersion type carrier in which an electrically conductive material, and the like are dispersed in the matrix resin.

Examples of the coating resin or matrix resin to be used with a carrier include, but are not limited to, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid copolymer, a straight silicone resin comprising organosiloxane bonds or a modification thereof; a fluororesin, a polyester, a polycarbonate, a phenolic resin, an epoxy resin, and the like.

Specific examples include styrenes, such as styrene, parachlorostyrene, α-methylstyrene, and the like; α-methylene fatty acid monocarboxylic acids, such as methyl acrylate, ethyl acrylate, n-propyl acrylate, lauryl acrylate, 2-ethylhexyl acrylate, methyl methacrylate, n-propyl methacrylate, lauryl methacrylate, 2-ethylhexyl methacrylate, and the like; nitrogen-containing acryls, such as dimethylaminoethyl methacrylate and the like; vinyl nitriles, such as acrylonitrile, methacrylonitrile, and the like; vinylpyridines, such as 2-vinylpyridine, 4-vinylpyridine, and the like; vinyl ethers, such as vinyl methyl ether, vinyl isobutyl ether, and the like; vinyl ketones, such as vinyl methyl ketone, vinyl ethyl ketone, vinyl isopropenyl ketone, and the like; polyolefins, such as ethylene, propylene, and the like; silicones, such as methyl silicone, methyl phenyl silicone, and the like; copolymers of fluorine-containing vinyl monomers, such as vinylidene fluoride, tetrafluoroethylene, hexafluoroethylene, and the like; polyesters containing bisphenol, glycol, and the like; an epoxy resin, a polyurethane resin, a polyamide resin, a cellulosic resin, a polyether resin, and the like.

These resins may be used alone or in combination of two or more.

The amount of coating resin is about 0.1 to 10 parts by mass for the carrier, and is preferably about 0.5 to 3.0 parts by mass.

Examples of the electrically conductive material include, but are not limited to, metals such as gold, silver, and copper; carbon black; and further, titanium oxide, zinc oxide, barium sulfate, aluminum borate, potassium titanate, tin oxide, carbon black, and the like.

Examples of the core material of the carrier include magnetic metals, such as iron nickel, cobalt, and the like; magnetic oxides, such as ferrite, magnetite, and the like; a glass bead, and the like, but in order to use the carrier with the magnetic brush method, the core is preferably made of a magnetic material. The volume-average particle diameter of the core material of a carrier is preferably 10 to 500 μm, and is more preferably 30 to 100 μm.

In order to coat the surface of the core material of a carrier with a resin, a method which carries out coating with a coating layer forming solution with which the coating resin and, as required, various additives are dissolved in an appropriate solvent can be mentioned. The solvent is not particularly limited, and may be selected as appropriate in consideration of the coating resin used, the coating suitability, and the like.

As a specific resin coating method, the maceration method, which soaks the core material of the carrier into the coating layer forming solution; the spray method which sprays the coating layer forming solution onto the surface of the core material of the carrier; the fluidized bed method which sprays the coating layer forming solution onto the core material of the carrier that is floated by means of the fluidized air; and the kneader coater method which mixes the core material of the carrier with the coating layer forming solution in the kneader coater and removes the solvent can be mentioned.

The mixing ratio (the ratio in mass) of the toner of the present invention to the above-mentioned carrier in the two-component developer is preferably in a range of about 1:100 (toner to carrier) to 30:100, and is more preferably in range of about 3:100 to 20:100.

<Image Forming Method>

The image forming method of the invention includes forming an electrostatic latent image on a latent image-holding member surface (latent image forming step); developing the electrostatic latent image formed on the latent image-holding member surface with a developer containing a toner to form a toner image (developing step); transferring the toner image formed on the latent image-holding member surface onto a transfer material surface (transferring step); and heat-fixing the toner image transferred onto the transfer material surface (fixing step), wherein the toner used is the toner for developing electrostatic latent images of the present invention.

The developer to be used in the image forming method of the present invention may be of either of the one-component system or that of the two-component system.

Further, in any of the respective steps, a process which is well known in image forming methods can be utilized. In addition, the image forming method may include steps other than the above steps.

For example, a cleaning step may be included.

The respective steps themselves are general ones, and are disclosed in, for example, JP-A Nos. 56-40868, 49-91231, and the like. The image forming method of the present invention itself can be implemented with a well-known image formation apparatus, such as a copying machine, a facsimile, or the like.

The latent image forming step is a step for forming an electrostatic latent image on the surface of a latent image-holding member. The development step is a step for forming a toner image by developing the electrostatic latent image formed on the surface of the latent image-holding member with a developer containing a toner. The transferring step is a step for transferring the toner image formed on the surface of the latent image-holding member to a surface of a recording medium.

The cleaning step is a step for removing the electrostatic latent image developer left on the electrostatic latent image-holding member.

For the image forming method of the present invention, an embodiment which further comprises a recycling step is preferable. The recycling step is a step for returning the toner for developing electrostatic latent images recovered in the cleaning step to the developing layer. The image forming method including the recycling step can be implemented with an image formation apparatus, such as a copying machine, a facsimile, or the like, of the toner recycling system type. Also, the image forming method is applicable to a recycling system which omits the cleaning step, and recovers the toner simultaneously with the development.

As the latent image-holding member, for example, an electrophotography photosensitive medium, a dielectric recording element, or the like can be used.

With the electrophotography photosensitive medium, the surface thereof is uniformly charged by means of a corotron charger, a contact charger, or the like, then it is exposed to light for formation of an electrostatic latent image (the latent image forming step). Then, the electrophotography photosensitive medium is brought into contact or proximity with the developing roller on the surface of which a developer layer is formed, in order to cause toner particles to adhere to the electrostatic latent image for formation of a toner image on the electrophotography photosensitive medium (the developing step). The toner image formed is transferred to the surface of a transfer material, such as a paper, by using a corotron charger, or the like (the transferring step). Further, the toner image transferred onto the surface of the transfer material is thermally fixed with a fuser for formation of a final toner image.

In thermal fixing by the fuser, a releasing agent is generally supplied to a fixing member of the fuser in order to prevent occurrence of offset, and the like.

In the toner of the present invention (including the two-component developer, also hereinbelow), when the binder resin has a crosslinking structure, an excellent releasability is provided as an effect of the crosslinking structure, and thus fixing can be carried out with the amount of use of the releasing agent being reduced or with no use of the releasing agent.

It is preferable that the releasing agent supplied to the fixing member is not used, from the viewpoint of elimination of the adherence of oil to the transfer material and the image after fixing. However, if the amount of releasing agent supplied is 0 mg/cm$^2$, the amount of wear of the fixing member that is caused when the fixing member is contacted with the transfer material, such as a paper, or the like, in fixing is increased, which may result in the durability of the fixing member being lowered and, thus, it is preferable that, if required, a trace amount of the releasing agent be supplied to the fixing member in a range of $8.0 \times 10^{-3}$ mg/cm$^2$ or less.

If the amount of the releasing agent supplied to the fixing member exceeds $8.0 \times 10^{-3}$ mg/cm$^2$, the releasing agent adhered to the image surface after the fixing will degrade the image quality, and especially when transmitted light is used as with an OHP, such a phenomenon may noticeably appear. In addition, the releasing agent may be heavily adhered to the transfer material, leading to occurrence of stickiness. Further, the greater the amount of the releasing agent supplied, the higher the required capacity of the reservoir which stores the releasing agent will be, which may make the size of the fixing apparatus itself large.

The releasing agent to be supplied to the fixing member is not particularly limited, but preferable examples include liquid releasing agents, such as dimethyl silicone oil, fluorine oil, fluorosilicone oil, modified oils, such as an amino-modified silicone oil, and the like. Among these, the modified oils, such as an amino-modified silicone oil, and the like, are excellent in terms of coatability/applicability to the fixing member, and are preferable, from the viewpoint of the capability of being adsorbed to the surface of the fixing member to form a uniform releasing agent layer. In addition, from the viewpoint of the capability of forming a uniform releasing agent layer, fluorine oil and fluorosilicone oil are preferable. With a conventional image forming method which does not use the toner of the present invention, using fluorine oil or fluorosilicone oil as the releasing agent to be supplied to the fixing member is not practical in terms of cost effectiveness because the supply amount of the releasing agent itself cannot be reduced, however, when the electrophotography toner of the present invention is used with the image forming method of the present invention, the supply amount of the releasing agent can be greatly reduced, presenting no problems of practical use also in terms of the cost-effectiveness.

The method for supplying the releasing agent to be supplied to the fixing member to the surface of a roller or belt as the fixing member to be used for heating and pressure fixing is not particularly limited, and examples thereof include the pad method which uses a pad impregnated with a liquid releasing agent, the web method, the roller method, the non-contact type shower method (the spray method), and the like. Among them, the web method and the roller method are preferable. With these methods, the releasing agent can be uniformly supplied, and yet the supply amount can be easily controlled, which is advantageous. In order to uniformly supply the releasing agent to the whole of the fixing member by using the shower method, it is required to separately use a blade or the like.

The supply amount of the releasing agent to be supplied to the fixing member can be measured as follows. Specifically, when plain paper which is used with a general copying machine (typically a copying paper manufactured by Fuji Xerox Co., Ltd., having a tradename of J Paper) is passed through the fixing member the surface of which is supplied with the releasing agent, the releasing agent is adhered to the plain paper. Then the releasing agent adhered is extracted by using a Soxhlet extractor. Herein, hexane is used as the solvent.

By determining the amount of the releasing agent contained in this hexane with an atomic absorption analyzer, the amount of the releasing agent adhered to the plain paper can be determined. This amount is defined as the amount of the releasing agent supplied to the fixing member.

Examples of the transfer material (the recording material) to which the toner image is to be transferred include plain paper, an OHP sheet, and the like, which are used with a copying machine, a printer, and the like, of the electrophotography type. In order to improve the smoothness of the image surface after the fixing, it is preferable that the surface of the transfer material also be smooth as much as practical, and, for example, a coated paper, a printing art paper, or the like, manufactured by coating the surface of a plain paper with resin or the like can be preferably used.

Because the image forming method of the present invention uses a developer comprising the toner of the present invention, fixing can be carried out at a low temperature, and the toner can retain the proper amount of friction charg(e)ing. Therefore, the degree of energy saving in image formation is excellent, and a satisfactory image can be formed, while occurrence of toner scattering, and the like is prevented.

EXAMPLES

The present invention will be more specifically described with the following examples, however, the present invention is not limited to thereto.

(Synthesis of Crystalline Resin)

Preparation of Crystalline Polyester Resin (1-1)

After charging 10 mol of 9-nonanediol, 9.25 mol of 1,10-dodecanedioic acid, 0.75 mol of 5-t-butylisophthalic acid, and a Ti(OBu)$_4$ catalyst (0.014 percent by mass for the acid component) into a three-necked flask, the container is evacuated of air by a pressure reduction operation, and further is placed under an inert atmosphere with nitrogen gas, and by mechanical stirring, reflux is carried out at 180° C. for 6 hrs. Thereafter, by reduced-pressure distillation, the unreacted monomers are removed, the temperature being gradually raised to 220° C. while stirring for 12 hrs until a viscous condition is produced. Then, using GPC (gel permeation chromatography), the molecular weight of a polyester resin (1-1) obtained is determined to find that the product has a weight-average molecular weight of 24,000 (a value converted with an HLC-8120GPC styrene standard substance manufactured by TOSOH CORPORATION). The thermal characteristics of the polyester resin (1-1) are determined by using a differential scanning calorimeter (DSC-50 manufactured by Shimadzu Corporation, with a temperature rise rate of 3° C./min) to find that the melting point is 74° C. In addition, the resin viscosity is measured by using ARES (name of apparatus; manufactured by Rheometrix Corp.) under the temperature condition of the melting point +20° C. to find that the viscosity is 1.2×10$^2$ Pa·S.

Preparation of Crystalline Polyester Resin (1-2)

After charging 10 mol of 9-nonanediol, 9.05 mol of 1,10-dodecanedioic acid, 0.75 mol of 5-t-butylisophthalic acid, and 0.2 mol of dimethylisophthalate-5-sodiumsulfonate, and a Ti(OBu)$_4$ catalyst (0.014 percent by mass for the acid component) into a three-necked flask, the container is evacuated of air by a pressure reduction operation, and further is placed under an inert atmosphere with nitrogen gas, and by mechanical stirring, reflux is carried out at 180° C. for 6 hrs. Thereafter, by reduced-pressure distillation, the unreacted monomers are removed, the temperature being gradually raised to 220° C. with stirring for 12 hrs until a viscous condition is produced. Then, using GPC (gel permeation chromatography), the molecular weight of a polyester resin (1-2) obtained is determined to find that the product has a weight-average molecular weight of 28,000. The thermal characteristics of the polyester resin (1-2) are determined by using a differential scanning calorimeter (DSC-50 manufactured by Shimadzu Corporation, the temperature rise rate being 3° C./min) to find that the melting point is 75° C. In addition, the resin viscosity is measured by using ARES (name of apparatus; manufactured by Rheometrix Corp.) under the temperature condition of the melting point +20° C. to find that the viscosity is 1.5×10$^2$ Pa·S.

Preparation of Crystalline Polyester Resin (1-3)

After charging 10 mol of 9-nonanediol, 9.25 mol of 1,10-dodecanedioic acid, 0.75 mol of 5-t-butylisophthalic acid, and 1.0 mol of dimethylisophthalate-5-sodiumsulfonate, and a Ti(OBu)$_4$ catalyst (0.014 percent by mass for the acid component) into a three-necked flask, the container is evacuated of air by a pressure reduction operation, and further is placed under an inert atmosphere with nitrogen gas, and by mechanical stirring, reflux is carried out at 180° C. for 6 hrs. Thereafter, by reduced-pressure distillation, the unreacted monomers are removed, the temperature being gradually raised to 250° C. with stirring for 12 hrs until a viscous condition is produced. Then, using GPC (gel permeation chromatography), the molecular weight of a polyester resin (1-3) obtained is determined to find that the product has a weight-average molecular weight of 22,000. The thermal characteristics of the polyester resin (1-3) are determined by using a differential scanning calorimeter (DSC-50 manufactured by Shimadzu Corporation, the temperature rise rate being 3° C./min) to find that the melting point is 74° C. In addition, the resin viscosity is measured by using ARES (name of apparatus; manufactured by Rheometrix Corp.) under the temperature condition of the melting point +20° C. to find that the viscosity is 1.1×10$^2$ Pa·S.

Manufacture of Resin Particles Containing Crystalline Resin and Amorphous Polymer Manufacture of Resin Particles (1-1)

600 g of the crystalline polyester resin (1-1) is heated to 100° C. to be melted, and added into a mixed solution of 350 g of styrene, 35 g of n-butylacrylate, 5 g of maleic acid (an unsaturated acid monomer), 24 g of dodecanethiol, and 10 g of hexadecane, being well stirred. Into this mixture, 50 g of dodecylbenzenesulfonic acid, 9 L of deionized water as the aqueous medium, and an appropriate quantity of an aqueous 5%-NH$_4$OH are added, and heated to 90° C. As the emulsifying machine, a "Clearmix" (manufactured by M-Technique Co., Ltd.) with which a pressurized hermetically sealed circulating layer is combined is used. The aqueous medium and the crystalline resin mixed monomers are charged into the circulating layer, and fed to the Clearmix at a flow rate of 1 l/min, the passed emulsion being returned to the circulating layer. The emulsification is performed for 1 hr at a temperature of 120° C. and a speed of 20,000 rpm. The particle diameter for the emulsified product is measured to find that the volume center particle diameter is 0.45 μm (measured with an LA-700 particle size distribution measuring apparatus manufactured by HORIBA, Ltd.). 3 L of this emulsified product is charged into a separable flask equipped with a thermometer, a stirrer, and a cooling tube, and further 1.3 g of ammonium persulfate is dissolved into 10 ml of deionized water, the solution being added into the flask, then polymerization is carried out for 6 hrs at 85° C. to polymerize amorphous polymers (radical polymerizable substances) for manufacturing resin particles (1-1) containing the crystalline polyester resin (1-1) and amorphous polymers.

The volume-average particle diameter of the resin particles (1-1) obtained is 0.50 μm, and the radical polymerization percentage determined from the gas chromatography is 99.9%. The difference in solubility parameter (δa−δc) between the crystalline polyester resin (1-1) and the amorphous polymer (radical polymerizable substance) is 1.16. Table 1 shows the solubility of maleic acid in water at 25° C.

Manufacture of Resin Particles (1-2)

Resin particles (1-2) are manufactured in the same manner as in the manufacture of the resin particles (1-1), except that the maleic acid used in the manufacture of the resin particles (1-1) is changed into the same amount of a maleic acid anhydride (an unsaturated acid monomer anhydride). The volume-average particle diameter of the resin particles (1-2) obtained is 0.51 μm, and the radical polymerization percentage determined from the gas chromatography is 99.9%. The difference in solubility parameter (δa−δc) between the crystalline polyester resin (1-1) and the amorphous polymer (radical polymerizable substance) is 1.17. Table 1 shows the solubility of the maleic acid anhydride in water at 25° C.

Manufacture of Resin Particles (1-3)

Resin particles (1-3) are manufactured in the same manner as in the manufacture of the resin particles (1-1), except that the maleic acid used in the manufacture of the resin particles (1-1) is changed into the same amount of fumaric acid (an unsaturated acid monomer). The volume-average particle diameter of the resin particles (1-3) obtained is 0.49 μm, and the radical polymerization percentage determined from the gas chromatography is 99.9%. The difference in solubility parameter (δa−δc) between the crystalline polyester resin (1-1) and the amorphous polymer (radical polymerizable substance) is 1.16. Table 1 shows the solubility of the fumaric acid in water at 25° C.

Manufacture of Resin Particles (1-4)

Resin particles (1-4) are manufactured in the same manner as in the manufacture of the resin particles (1-1), except that the maleic acid used in the manufacture of the resin particles (1-1) is changed into the same amount of itaconic acid (an unsaturated acid monomer). The volume-average particle diameter of the resin particles (1-4) obtained is 0.51 μm, and the radical polymerization percentage determined from the gas chromatography is 99.9%. The difference in solubility parameter (δa−δc) between the crystalline polyester resin (1-1) and the amorphous polymer (radical polymerizable substance) is 1.15. Table 1 shows the solubility of the itaconic acid in water at 25° C.

Manufacture of Resin Particles (1-5)

Resin particles (1-5) are manufactured in the same manner as in the manufacture of the resin particles (1-1), except that, the maleic acid used in the manufacture of the resin particles (1-1) is changed into the same amount of an itaconic acid anhydride (an unsaturated acid monomer anhydride). The volume-average particle diameter of the resin particles (1-5) obtained is 0.45 μm, and the radical polymerization percentage determined from the gas chromatography is 99.9%. The difference in solubility parameter (δa−δc) between the crystalline polyester resin (1-1) and the amorphous polymer (radical polymerizable substance) is 1.15. Table 1 shows the solubility of the itaconic acid anhydride in water at 25° C.

Manufacture of Resin Particles (1-6)

Resin particles (1-6) are manufactured in the same manner as in the manufacture of the resin particles (1-1), except that, the crystalline polyester resin (1-1) used in the manufacture of the resin particles (1-1) is changed into the same amount of the crystalline polyester resin (1-3), and the maleic acid is changed into the same amount of an acrylic acid (an unsaturated acid monomer). The volume-average particle diameter of the resin particles (1-6) obtained is 0.35 μm, and the radical polymerization percentage determined from the gas chromatography is 99.9%. The difference in solubility parameter (δa−δc) between the crystalline polyester resin (1-3) and the amorphous polymer (radical polymerizable substance) is 0.84. Table 1 shows the solubility of the acrylic acid in water at 25° C.

Manufacture of Resin Particles (1-7)

Resin particles (1-7) are manufactured in the same manner as in the manufacture of the resin particles (1-1), except that the crystalline polyester resin (1-1) used in the manufacture of the resin particles (1-1) is changed into the same amount of the crystalline polyester resin (1-2), and the maleic acid is changed into the same amount of an acrylic acid (an unsaturated acid monomer). The volume-average particle diameter of the resin particles (1-7) obtained is 0.40 μm, and the radical polymerization percentage determined from the gas chromatography is 99.9%. The difference in solubility parameter (δa−δc) between the crystalline polyester resin (1-2) and the amorphous polymer (radical polymerizable substance) is 1.02. Table 1 shows the solubility of the acrylic acid in water at 25° C.

Preparation of Releasing Agent Dispersion

Ester wax (WE-2, manufactured by NOF Corporation, with a melting point of 65° C.): 50 parts by mass Anionic surfactant (Neogen RK, manufactured by DAI-ICHI KOGYO SEIYAKU CO., LTD.): 5 parts by mass Deionized water: 200 parts by mass The components above are mixed, and heated to 95° C., and dispersed in a homogenizer (Ultra-Tarrax T50, manufactured by IKA Labortechnik GmbH), and then dispersed in a Manton Gaulin high-pressure homogenizer (manufactured by Gaulin, Inc.), to prepare a releasing agent dispersion in which a releasing agent having an average particle diameter of 230 nm is dispersed (concentration of releasing agent: 20 percent by mass).

Preparation of Colorant Dispersion

Cyan pigment (Pigment Blue 15:3 (copper phthalocyanin), manufactured by DAI-ICHI KOGYO SEIYAKU CO., LTD.): 1000 parts by mass Anionic surfactant (Neogen R, manufactured by DAI-ICHI KOGYO SEIYAKU CO., LTD.): 150 parts by mass Deionized water: 9000 parts by mass The components above are mixed, dissolved, and dispersed in a high-pressure impact type disperser (Altimizer HJP30006, manufactured by Sugino Machine Ltd.) for about 1 hour to prepare a colorant dispersion in which a colorant (a cyan pigment) is dispersed. The average particle diameter for the colorant (a cyan pigment) in the colorant dispersion is 0.15 μm, and the concentration of colorant particles is 23 percent by mass.

Example 1-1

Manufacture of Toner Particles

Resin particles (1-1): 950 parts by mass

Colorant dispersion: 22.87 parts by mass

Releasing agent dispersion: 50 parts by mass

Nonionic surfactant (IGEPAL CA897): 0.5 parts by mass

The above raw materials are placed in a 5-L cylindrical stainless steel container, and are dispersed and mixed for 30 minutes while being subjected to a shearing force at 8000 rpm by using the Ultra-Tarrax. Then, as the aggregation agent, 0.14 parts by mass of an aqueous 10% nitric acid of polyaluminum chloride is dropped. In this case, the pH of the raw material dispersion is controlled to within a range of 4.2 to 4.5. The pH is adjusted with an aqueous 0.3N nitric acid or an aqueous 1N sodium hydroxide, as required.

Thereafter, the raw material dispersion is moved to a polymerization kettle equipped with a stirring apparatus and a thermometer, and is heated to promote the growth of the deposited aggregated particles at 40° C., and at the time when the volume-average particle diameter is increased to 6.0 µm, the pH is raised to 9.0, which is then followed by raising the temperature to 90° C., and the solution is retained at 90° C. for 2 hours, then the pH is gradually lowered to 6.5, which is then followed by stopping the heating, and leaving the solution to cool. Thereafter, the particles are sieved by using a 45 µm mesh, are repeatedly washed with water, and then dried with a freezing dryer. By using a Coulter counter TAII (manufactured by Coulter Electronics Ltd., with an aperture diameter of 50 µm), the volume-average particle diameter of the final toner particles is determined to find that the volume-average particle diameter is 6.0 µm, and the volume-average particle diameter distribution is 1.22.

The result of measurement of the volume-average particle diameter distribution of the toner particles is evaluated by the following criteria. Table 1 shows the result of the evaluation.

(Volume-Average Particle Diameter Distribution Index GSDv)

A: Volume-average particle diameter distribution is 1.25 or under.

B: Volume-average particle diameter distribution is over 1.25 to 1.30.

C: Volume-average particle diameter distribution is over 1.30.

Manufacture of toner for developing electrostatic latent images

To 100 parts of the obtained toner particles (1-1), 1 part of a colloidal silica (R972, manufactured by NIPPON AEROSIL CO., LTD.) is externally added, and these are mixed with each other by using a Henschel mixer to obtain a toner for developing electrostatic latent images.

Manufacture of Developer and Evaluation 100 parts of ferrite particles (manufactured by Powder Tech Corporation, with average particle diameter of 50 µm) and 1 part of a methacrylate resin (manufactured by Mitsubishi Rayon Co., Ltd., with a molecular weight of 95,000) are placed in a pressurized kneader together with 500 parts of toluene to be mixed at room temperature for 15 min, and then to be mixed under reduced pressure while the temperature is raised to 70° C., then being cooled after the toluene being removed, which is then followed by particle grading with the use of a 105 µm sieve for manufacturing a ferrite carrier (a resin-coated carrier). This ferrite carrier and the above-mentioned toner for developing electrostatic latent images are mixed with each other for manufacturing a two-component system electrostatic latent image developer having a toner concentration of 7 percent by mass. For this electrostatic latent image developer, the absolute value of the amount of charging (µC/g) under the environmental conditions of 80% RH and 28° C. is measured with the use of a blow-off charging amount measuring apparatus for evaluation to find that the amount of toner charging is −35 µC/g, indicating a good charging characteristic. Further, for the image quality characteristics, an improved model of DocuCentre Color 500 manufactured by Fuji Xerox Co., Ltd is used to form an image; and the fixing temperature, the initial image quality, and the image quality after production of 10,000 copies are evaluated; and visual evaluation is performed by the following criteria. Table 1 shows the result of the evaluation.

The above-mentioned image formation comprises the latent image formation step, the development step, the transferring steps, and the fixing step.

(Charging Characteristic)

A: Amount of charging is −30 µC/g or under.

B: Amount of charging is from −30 µC/g to −10 µC/g.

C: Amount of charging is over −10 µC/g.

(Image Quality Characteristics)

A: No toner scattering is caused, and a sufficient image density and a uniform image quality are obtained, thus good image quality characteristics presenting no problems of practical use are provided.

B: A slight toner scattering is found, but an image density presenting no problems of practical use and a uniform image quality are obtained.

C: Marked toner scattering is observed, and the initial image density and the uniformity of image quality are insufficient, which presented problems of practical use.

Example 1-2

Manufacture of Toner Particles (1-2)

Toner particles (1-2) are manufactured in the same manner as in Example 1-1, except that, in Example 1-2, resin particles (1-2) are used instead of the resin particles (1-1). For the obtained toner particles (1-2), a Coulter counter TAII (manufactured by Coulter Electronics Ltd., with an aperture diameter of 50 (m) is used to determine the volume-average particle diameter of the final toner particles to find that the volume-average particle diameter is 5.9 µm, and the volume-average particle diameter distribution is 1.23.

Developer Preparation and Image Quality Evaluation

An electrostatic latent image developer is manufactured in the same manner as in Example 1-1, except that, in Example 1-2, the toner particles (1-1) are changed into the toner particles (1-2), and measurement and evaluation are carried out in the same manner as in Example 1-1. The result is that the amount of toner charging is −35 µC/g, indicating a good charging characteristic. Further, the fixing temperature measured is 100° C., a low temperature which has not been conventionally given, and in terms of the image quality characteristics, no toner scattering is caused, and a sufficient image density and a uniform image quality are obtained, thus good image quality characteristics presenting no problems of practical use are provided.

Example 1-3

Manufacture of Toner Particles (1-3)

Toner particles (1-3) are manufactured in the same manner as in Example 1-1, except that, in Example 1-3, resin particles (1-3) are used instead of the resin particles (1-1). For the obtained toner particles (1-3), a Coulter counter TAII (manufactured by Coulter Electronics Ltd., with an aperture diameter of 50 µm) is used to determine the volume-average particle diameter of the final toner particles to find that the volume-average particle diameter is 6.0 µm, and the volume-average particle diameter distribution is 1.23.

Developer Preparation and Image Quality Evaluation

An electrostatic latent image developer is manufactured in the same manner as in Example 1-1, except that, in Example 1-3, the toner particles (1-1) are changed into the toner particles (1-3), and measurement and evaluation are carried out in the same manner as in Example 1-1. The result is that the amount of toner charging is −36 µC/g, indicating a good charging characteristic. Further, the fixing temperature measured is 100° C., a low temperature which has not been conventionally given, and in terms of the image quality char

Example 1-4

Manufacture of Toner Particles (1-4)

Toner particles (1-4) are manufactured in the same manner as in Example 1-1, except that, in Example 1-4, resin particles (1-4) are used instead of the resin particles (1-1). For the obtained toner particles (1-4), a Coulter counter TAII (manufactured by Coulter Electronics Ltd., with an aperture diameter of 50 µm) is used to determine the volume-average particle diameter of the final toner particles to find that the volume-average particle diameter is 6.1 µm, and the volume-average particle diameter distribution is 1.23.

Developer Preparation and Image Quality Evaluation

An electrostatic latent image developer is manufactured in the same manner as in Example 1-1, except that, in Example 1-4, the toner particles (1-1) are changed into the toner particles (1-4), and measurement and evaluation are carried out in the same manner as in Example 1-1. The result is that the amount of toner charging is −34 µC/g, indicating a good charging characteristic. Further, the fixing temperature measured is 100° C., a low temperature which has not been conventionally given, and in terms of the image quality characteristics, no toner scattering is caused, and a sufficient image density and a uniform image quality are obtained, thus good image quality characteristics presenting no problems of practical use are provided.

Example 1-5

Manufacture of Toner Particles (1-5)

Toner particles (1-5) are manufactured in the same manner as in Example 1-1, except that, in Example 1-5, resin particles (1-5) are used instead of the resin particles (1-1). For the obtained toner particles (1-5), a Coulter counter TAII (manufactured by Coulter Electronics Ltd., with an aperture diameter of 50 µm) is used to determine the volume-average particle diameter of the final toner particles to find that the volume-average particle diameter is 6.2 µm, and the volume-average particle diameter distribution is 1.22.

Developer Preparation and Image Quality Evaluation

An electrostatic latent image developer is manufactured in the same manner as in Example 1-1, except that, in Example 1-5, the toner particles (1-1) are changed into the toner particles (1-5), and measurement and evaluation are carried out in the same manner as in Example 1-1. The result is that the amount of toner charging is −37 µC/g, indicating a good charging characteristic. Further, the fixing temperature measured is 100° C., a low temperature which has not been conventionally given, and in terms of the image quality characteristics, no toner scattering is caused, and a sufficient image density and a uniform image quality are obtained, thus good image quality characteristics presenting no problems of practical use are provided.

Comparative Example 1-1

Manufacture of Toner Particles (1-6)

Toner particles (1-6) are manufactured in the same manner as in Example 1-1, except that, in Comparative Example 1-1, resin particles (1-6) are used instead of the resin particles (1-1). For the toner particles (1-6) obtained, a Coulter counter TAII (manufactured by Coulter Electronics Ltd., with an aperture diameter of 50 µm) is used to determine the volume-average particle diameter of the final toner particles to find that the volume-average particle diameter is 6.5 µm, and the volume-average particle diameter distribution is 1.37, which has revealed that problems are presented in terms of sufficient particle diameter control and toner particle size distribution controllability.

Developer Preparation and Image Quality Evaluation

An electrostatic latent image developer is manufactured in the same manner as in Example 1-1, except that, in Comparative Example 1-1, the toner particles (1-1) are changed into the toner particles (1-6), and measurement and evaluation are carried out in the same manner as in Example 1-1. The result is that the amount of toner charging is as low as −3 µC/g. Further, the fixing temperature measured is 100° C., a low temperature which has not been conventionally given, but in terms of the image quality characteristics, marked toner scattering is observed, and the initial image density and the uniformity of image quality are insufficient, which presented problems on practical use.

Comparative Example 1-2

Manufacture of Toner Particles (1-7)

Toner particles (1-7) are manufactured in the same manner as in Example 1-1, except that, in Comparative Example 1-2, resin particles (1-7) are used instead of the resin particles (1-1). For the obtained toner particles (1-7), a Coulter counter TAII (manufactured by Coulter Electronics Ltd., with an aperture diameter of 50 µm) is used to determine the volume-average particle diameter of the final toner particles to find that the volume-average particle diameter is 7.2 µm, and the volume-average particle diameter distribution is 1.38, which has revealed that problems are presented in terms of sufficient particle diameter control and toner particle size distribution controllability.

Developer Preparation and Image Quality Evaluation

An electrostatic latent image developer is manufactured in the same manner as in Example 1-1, except that, in Comparative Example 1-2, the toner particles (1-1) are changed into the toner particles (1-7), and measurement and evaluation are carried out in the same manner as in Example 1-1. The result is that the amount of toner charging is as low as −2 µC/g. Further, the fixing temperature measured is 100° C., a low temperature which has not been conventionally given, but in terms of the image quality characteristics, marked toner scattering is observed, and the initial image density and the uniformity of image quality are insufficient, which presented problems of practical use.

TABLE 1

|  |  | Example 1-1 Resin particles (1-1) | Example 1-2 Resin particles (1-2) | Example 1-3 Resin particles (1-3) | Example 1-4 Resin particles (1-4) | Example 1-5 Resin particles (1-5) | Comparative Example 1-1 Resin particles (1-6) | Comparative Example 1-1 Resin particles (1-7) |
|---|---|---|---|---|---|---|---|---|
| Type of resin particles | | | | | | | | |
| Unsaturated acid monomer or Unsaturated monomer acidanhydride | Type of unsaturated acid | Maleic acid | Maleic acid anhydride | Fumaric acid | Itaconic acid | Itaconic acid anhydride | Acrylic acid | Acrylic acid |
| | Solubility (g/100 g-H$_2$O) | 78.8 | 1.0 | 0.7 | 5.9 | 1.0 | ∞ | ∞ |
| Result of evaluation | δa − δc | 1.16 | 1.17 | 1.16 | 1.15 | 1.15 | 0.84 | 1.02 |
| | Volume-average particle diameter distribution | A | A | A | A | A | C | C |
| | Toner charging characteristic | A | A | A | A | A | C | C |
| | Image quality characteristics | A | A | A | A | A | C | C |

As shown in Table 1, it is found that Examples 1-1 to 1-5 have good particle size distribution characteristics and charging characteristics in comparison with Comparative Examples 1-1 and 1-2, because Examples 1-1 to 1-5 are excellent in toner particle size controllability and particle size distribution controllability.

Hereinbelow, other Examples of the present invention will be described.

Measurement of the respective physical characteristics in the following Examples is carried out as described below.

(Particle Size and Particle Size Distribution Determination Method)

When particles to be measured have a size of 2 μm or more, Coulter counter Model TAII (manufactured by Beckman Coulter, Inc.) is used as a measuring apparatus, and ISOTON-II (manufactured by Beckman Coulter, Inc.) is used as an electrolyte.

As a determination method, 0.5 to 50 mg of the test sample is added into 2 ml of a surfactant as the dispersing agent, preferably an aqueous 5% sodium alkylbenzenesulfonate. Then the dispersion of the test sample is added to 100 to 150 ml of the electrolyte.

The electrolyte in which the sample is suspended is dispersed for approximately 1 min by means of an ultrasonic wave disperser, and then by using the Coulter counter Model TAII, the particle size distribution of the particles of 2 to 60 μm is determined with an aperture of 100 μm as the aperture diameter to find the volume-average distribution and the number-average distribution. The number of particles to be measured is specified to be 50,000.

The toner particle size distribution is determined by the following method. For each particle size range (channel) resulting from division of the particle size distribution measured, a cumulative volume distribution curve is drawn from the side of the smaller particle size, and the volume-average particle diameter providing 16% cumulative is defined as D16; that providing 50% cumulative being defined as D50; and that providing 84% cumulative being defined as D84. The volume-average particle diameter is the D50, and the GSDv is calculated by the following formula:

$$GSDv = (D84/D16)^{0.5}$$

Likewise, for each particle size range (channel) resulting from division of the particle size distribution measured, a cumulative number distribution curve is drawn from the side of the smaller particle size, and the number-average particle diameter providing 50% cumulative is defined as the number-average particle diameter.

When the particles under test have a size of under 2 μm, a laser diffraction particle size distribution analyzer (LA-700, manufactured by HORIBA, Ltd.) is used for determination. As the determination method, a sample in the state of a dispersion is prepared such that the solid content is approx. 2 g, and into this, deionized water is added to produce a solution of approx. 40 ml. This is then charged into the cell until an appropriate concentration is given, and when the concentration in the cell becomes roughly stable after waiting for approx. 2 min, the determination is carried out. The obtained volume-average particle diameter for each channel is cumulated from the side of the smaller volume-average particle size, and the volume-average particle size providing 50% cumulative is defined as the volume-average particle diameter.

(Determination Method for Weight-average Molecular Weight)

The weight-average molecular weight is determined under the following conditions. As the GPC (gel permeation chromatography) apparatus, an HLC-8120GPC, SC-8020 (manufactured by TOSOH CORPORATION) is used; two TSKgel, Super HM-H columns (manufactured by TOSOH CORPORATION, with 6.0 mm IDX 15 cm) are used; and as the eluent, THF (tetrahydrofran) is used. As the experimental conditions, a sample concentration of 0.5%, a flow rate of 0.6 ml/min, a sample injection amount of 10 μl, a measuring temperature of 40° C., and an IR detector are used for experiment. The calibration curve is prepared from ten samples of the TOSOH CORPORATION Polystyrene Standard Sample TSK standards: A-500, F-1, F-10, F-80, F-380, A-2500, F-4, F-40, F-128, and F-700.

(Determination Method for Melting Point and Glass Transition Temperature)

The melting point and the glass transition temperature are determined from the main maximum peak measured in conformity with ASTM D3418-8. For measurement of the main maximum peak, a DSC-7 differential scanning calorimeter (manufactured by Perkin Elmer Corporation) can be used. For temperature correction for the detector section of this apparatus, the melting points of indium and zinc are used, and for correction of the quantity of heat, the heat of fusion of indium is used. For the sample, a pan made of aluminum is used, an empty pan being set for control, and the measurement is carried out at a temperature rise rate of 10° C./min.

(Determination of Crystallinity)

Whether a resin is crystalline or not can be determined by using a heat absorption curve obtained by the above-mentioned method in accordance with the definition of melting point as given in JIS K-7121. Specifically, a specific resin has been determined to have a crystallinity when the temperature difference between the intersection (the melting start point) of a straight line drawn by extending the base line on the lower temperature side toward the higher one with a tangent line drawn at the point providing a maximum slope on the curve on the lower temperature side of the melting peak (heat absorption peak), and the intersection (the melting end point) of a straight line drawn by extending the base line on the higher temperature side toward the lower one with a tangent line drawn at the point providing a maximum slope on the curve on the higher temperature side of the melting peak (heat absorption peak) is 50° C. or less, and the form of the curve shows no stepwise geometry as given in the same JIS K-7121.

(Determination of SD Value)

As an index to evaluate the particle size distribution of the resin particles, the SD value is determined. The SD value is expressed by the volume-average particle diameter of the resin particles in the dispersion divided by the number-average particle diameter thereof. Generally, the volume-average particle diameter tends to be influenced by the particles having a larger particle diameter, while the number-average particle diameter tends to be influenced by the particles having a smaller particle diameter, thus, if the particle size distribution is monodispersed, the SD value will be 1.0, and the broader the particle size distribution, the greater the SD value. Such an SD value is determined by using a laser diffraction particle size distribution analyzer (LA-700, manufactured by HORIBA, Ltd.), as is the case with the above-mentioned GSDv.

Example 2-1

Preparation of Polyester Resin 2-1

After charging 128.2 parts by mass of 1,9-nonanediol (Log (P)=1.86) and 170.4 parts by mass of 1,10-dodecanedioic acid (Log(P)=2.7), 13.4 g of 5-t-butylisophthalic acid (Log (P)=2.85), 350.0 parts by mass of a styrene monomer (Log (P)=2.67), 35.0 parts by mass of a butylacrylate monomer (Log(P)=1.88), 2 parts by mass of hexadecane (Log(P)=7.18), and 24 g of dodecanethiol (Log(P)=5.14) in a three-necked flask, these are well mixed at 50° C., and then cooled at room temperature before 1.0 parts by mass of scandium trifluoromethanesulfonate $Sc(OSO_2CF_3)_3$ is added as the catalyst, and dissolved.

This mixture is charged into 1700 parts by mass of deionized water in which 11 parts by mass of sodium dodecylbenzenesulfonate, and 1.0 parts by mass of scandium trisdodecylsulfate are dissolved, and after the preliminary dispersion by means of ultrasonic wave, the solution is emulsification-dispersed at 50° C. by using an ultra high-pressure homogenizer (Nanomizer, manufactured by YOSHIDA KIKAI Co., Ltd.) to obtain an emulsified product having a volume-average particle diameter of 0.2 μm (measured with LA-700, manufactured by HORIBA, Ltd.). This emulsified product is thrown into a 5-L pressurized reactor equipped with a stirrer, and polymerization is carried out at 100° C. for 12 hrs under a nitrogen atmosphere to obtain a dispersion of resin particles (2-1). The reaction product maintains a stable emulsified state; the volume-average particle diameter is 0.2 μm; and the SD value, i.e., the ratio between the volume-average particle diameter and the number-average particle diameter (volume-average particle diameter/number-average particle diameter) is 1.3.

A small amount of the sample after this reaction is taken out to be dried at room temperature; the solid matter left is cleaned with methanol, filtered, and dried in an oven; and then the polymerized polymer component is taken out. As a result of determination of the weight-average molecular weight thereof with a GPC (gel permeation chromatography) apparatus (HLC-8120GPC, manufactured by TOSOH CORPORATION), the weight-average molecular weight is found to be 23,000, and by using deuterated chloroform, and a proton NMR apparatus (manufactured by Varian Associates, 300 MHz) to examine the composition ratio of the polyester and the radical polymerized polymers, such as a polystyrene butylacrylate copolymer, and the like, in the polymer component, it is found that the yield for the styrene or butylacrylate and the copolymer thereof is under 2%, thus it is estimated that the polymer component at this time is largely occupied by the polyester.

This polymer composition (a polyester resin) is dissolved into a THF solution, and then by using an ethanol solution of potassium hydroxide, the acid number is determined to be 10 mg KOH/g. This value can be considered to approximately express the acid number of the above-mentioned polyester.

Further, the thermal characteristics of this resin are determined by the use of a differential scanning calorimeter (DSC-50 manufactured by Shimadzu Corporation) and the crystallinity is determined using an X-ray diffractometer (XRD, manufactured by Shimadzu Corporation) to find that this resin is a crystalline resin, having a melting point of 70° C.

Polymerization of Radical Polymerizable Monomer 2-1

Into the resin dispersion (2-1) obtained above, 10.0 parts by mass of maleic acid is added, and left at room temperature for 12 hrs, and at 80° C. for 1 hour while stirring to thoroughly distribute the maleic acid in the resin particles, which is then followed by adding, into the solution, 10 parts by mass of deionized water in which 2.5 parts by mass of ammonium persulfate is dissolved, and further carrying out polymerization under a nitrogen atmosphere for 5 hrs again at 80° C. to obtain a stable dispersion of resin particles (2-2) providing a volume-average particle diameter of 0.2 μm, and an SD value of 1.3.

After the polymerization, a small amount of the sample is taken out to be dried at room temperature, and the solid matter left is cleaned with methanol, filtered, and dried in the same manner as with the above-mentioned polymerization for polyester, then by using a proton NMR apparatus to determine the ratio of the polyester and the yield of the radical polymerized polymer in the polymer component, it is found that almost all of the radical monomers compounded are used for polymerization, the yield for them being over 99%. In addition, also from the gas chromatography analysis of the emulsified product, it is found that the total amount of the residual radical monomer (radical polymerizable monomer) component is 200 ppm or less. Further, determination of the molecular weight using GPC revealed that the weight-average molecular weight gives two peaks of 23,000 and 31,000, which are the values approx. equal to that for the previously polymerized polyester, and a new macromolecular weight peak, respectively. The melting point for the polyester obtained is held at 70° C. In addition, the difference in weight-average solubility parameter that is determined from the polyester monomer used and the radical polymerizable monomer used, i.e., the value of (δv−δpe) is 1.09.

Manufacture of Toner Particles 2-1

Preparation of Pigment Dispersion:

1000 parts by mass of a cyan pigment (Pigment Blue 15:3, manufactured by DAI-ICHI KOGYO SEIYAKU CO., LTD.), 150 parts by mass of an anionic surfactant (Neogen R, manufactured by DAI-ICHI KOGYO SEIYAKU CO., LTD.), and 9000 parts by mass of deionized water are mixed into a solution, and dispersion is carried out for approx. 1 hr by using a high-pressure impact type disperser (Altimizer HJP30006, manufactured by Sugino Machine Ltd.) to prepare a dispersion in which a cyan pigment is dispersed. The average particle diameter for the cyan pigment dispersed is 0.15 μm, and the concentration of colorant particles is 23 percent by mass.

Preparation of Ester Wax Dispersion:

50 parts by mass of an ester wax (WE-2, manufactured by NOF Corporation, with a melting point of 65° C.), an anionic surfactant (Neogen RK, manufactured by DAI-ICHI KOGYO SEIYAKU CO., LTD.), and 200 parts by mass of deionized water are mixed, and heated to 95° C., and dispersion is carried out by using a homogenizer (Ultra-Tarrax T50, manufactured by IKA Labortechnik GmbH), then a Manton Gaulin high-pressure homogenizer (manufactured by Gaulin, Inc.) is used for dispersion treatment to prepare an ester wax dispersion providing an average particle diameter of 0.23 μm and a concentration of particles of 20 percent by mass.

Preparation of Toner Particles 2-1: Emulsion Polymerization Aggregation Method 400 parts by mass of the dispersion of resin particles (2-2) obtained by polymerizing the above-mentioned radical polymerizable monomers, 34.4 parts by mass of the above-mentioned pigment dispersion, 33 parts by mass of the ester wax dispersion, 0.5 parts by mass of a nonionic surfactant (IG-EPAL CA897), and 265 parts by mass of deionized water are placed in a 2-L cylindrical stainless steel container, and are dispersion mixed for 30 min while being subjected to a shearing force at 8000 rpm by using the Ultra-Tarrax. Then, as the aggregation agent, 0.18 parts by mass of an aqueous 10% nitric acid of polyaluminum chloride is dropped in. In this case, the pH of the raw material dispersion is adjusted to within the range of 4.2 to 4.5 with an aqueous 1N sodium hydroxide. Thereafter, with a stainless steel polymerization kettle equipped with a stirring apparatus and a thermometer, the raw material dispersion is stirred while the resin particles, the pigment particles, and the wax particles are gradually heated and aggregated to adjust the volume-average particle diameter (determined with a Coulter counter TAII, manufactured by Coulter Electronics Ltd., with an aperture diameter of 50 μm) to 6.0 μm. Thereafter, the pH is raised to 9.0, which is then followed by raising the temperature to 78° C., and the solution is retained at 78° C. for 3 hrs to obtain toner particles in the shape of a potato providing a volume-average particle diameter D50v of 6.0 μm, and a volume-average particle size distribution index (GSD) of 1.23. Thereafter, after being cooled, the toner particles are sieved with a 45-μm mesh, are repeatedly washed with water for sufficient cleaning, and then dried with a freezing dryer to obtain toner particles 2-1.

Preparation of Developer 2-1 and Evaluation

To 100 parts of the toner particles (2-1) obtained, 1 part of a colloidal silica (R972, manufactured by NIPPON AEROSIL CO., LTD.) is externally added, and these are mixed with each other by using a Henschel mixer to obtain a toner for developing electrostatic latent images. 100 parts of ferrite particles (manufactured by Powder Tech Corporation, with average particle diameter of 50 μm) and 1 part of a methacrylate resin (manufactured by Mitsubishi Rayon Co., Ltd., with a molecular weight of 95,000) are placed in a pressurized kneader together with 500 parts of toluene to be mixed at room temperature for 15 min, and then to be mixed under reduced pressure while the temperature being raised to 70° C., then being cooled after the toluene is removed, which is then followed by particle grading with the use of a 105-μm sieve for manufacturing a ferrite carrier (a resin-coated carrier). This ferrite carrier and the above-mentioned toner for developing electrostatic latent images are mixed with each other for manufacturing a two-component system developer for electrostatic latent images having a toner concentration of 7 percent by mass.

For this developer for electrostatic latent images, the initial amount of charging and the environmental sustainability for the amount of charging after being left for 1 week under the environmental conditions of 80% RH and 28° C. are measured with the use of a blow-off charging amount measuring apparatus for evaluation, with the good result that the initial amount of charging is 35 μC/g, and the sustainability for the amount of charging after one week aging is over 98%. Further, for evaluation of the fixing temperature and the initial image quality for the developer obtained, an improved model of DocuCenter Color 500 manufactured by Fuji Xerox Co., Ltd is used to form an image. In this case, the fixing temperature as the item under evaluation is defined as a minimum temperature at which the toner particles form a continuous film layer, and for the image quality characteristics, the image quality unevenness (visual level), the toner scattering, and the fine line reproducibility are evaluated. As a result of this, it is found that the fixing can be performed at a temperature as low as 100° C.; for freedom from unevenness of image quality, that from toner scattering, and fine line reproducibility, good results can be obtained; and coexistence of an excellent low-temperature fixability and good image quality characteristics can be achieved.

Example 2-2

Polymerization for Polyester Resin 2-2

As in Example 2-1, a multivalent carboxylic acid, a polyhydric alcohol, and a catalyst are mixed; then 350 parts by mass of a styrene monomer (Log(P)=2.67), 35 parts by mass of a butylacrylate monomer (Log(P)=1.88), and 24 parts by mass of dodecanethiol (Log(P)=5.14) are further mixed, and emulsified into water in the same manner as in Example 2-1; which is then followed by polymerization at 80° C. for 6 hrs to obtain a dispersion of resin particles (2-3). The particle diameter of the resin particles obtained is 0.15 μm; the SD value is 1.3; the weight-average molecular weight for the polyester resin is 18,000; and the melting point is 69° C.

Polymerization of Radical Polymerizable Monomer 2-2

Polymerization is carried out in the same manner as for the dispersion of resin particles (2-2) in Example 2-1 to obtain a dispersion of resin particles (2-4), except that the dispersion of resin particles (2-3) is used, and 13 parts by mass of itaconic acid is used instead of the maleic acid. The particle diameter of the resin particles obtained is 0.15 μm; the SD value is 1.3; the polymerization yield for the radical polymerizable monomer is over 99%; the weight-average molecular weight for the resin particles obtained exhibits a peak at 18,000 and 29,000; and the melting point is 69° C. In addition, the difference in weight-average solubility parameter that is determined from the polyester monomer used and the radical polymerizable monomer used, i.e., the value of (δv−δpe), is 1.06.

Manufacture of Toner Particles 2-2

The final toner is obtained by preparing a pigment dispersion and an ester wax dispersion, then aggregating these, and further heating them to 78° C. for fusion of the particles, in the same manner as in Example 2-1, except that the above-mentioned dispersion of resin particles (2-4) is used. The volume-average particle diameter of the toner obtained is 5.0 μm; the volume-average particle size distribution is 1.23; and the shape of the toner particles is spherical.

Preparation of Developer 2-2 and Evaluation

In the same manner as in Example 2-1, except that the toner particles 2-2 are used, a developer 2-2 is prepared, and the charging characteristic and image quality thereof are evaluated. As a result of this, the developer initial charging characteristic is found to be 41 μC/g, and the sustainability thereof after aging is over 99%. The fixing characteristics and the image quality characteristics are evaluated in the same manner as in Example 2-1 to find that the developer 2-2 provides a fixing capability at a temperature as low as 100° C. and excellent image quality characteristics.

Example 2-3

Polymerization for Polyester Resin 2-3

Polymerization is carried out as in Example 2-1 to obtain a dispersion of resin particles (2-5), except that a mixture of 184.2 parts by mass of dodecanedioic acid (Log(P)=2.7), a multivalent carboxylic acid, and 128.2 parts by mass of 1,9-nonanediol (Log(P)=1.86), a polyhydric alcohol, is used, and 350 parts by mass of a styrene monomer (Log(P)=2.67), and 35 parts by mass of butylacrylate (Log(P)=1.88) are used as radical polymerizable monomers. The particle diameter of the resin particles obtained is 0.25 μm; the SD value is 1.3; the weight-average molecular weight for the polyester resin is 15,000; and the melting point is 69° C.

Polymerization of Radical Polymerizable Monomer 2-3

Polymerization is carried out in the same manner as for the dispersion of resin particles (2-2) in Example 2-1 to obtain a dispersion of resin particles (2-6), except that the dispersion of resin particles (2-5) is used, and 7 g of acrylic acid is used instead of the maleic acid. The particle diameter of the resin particles obtained is 0.25 μm; the SD value is 1.3; the polymerization yield for the radical polymerizable monomer is over 99%; the weight-average molecular weight exhibits a peak at 15,000 and 30,000; and the melting point is 69° C. In addition, the difference in weight-average solubility parameter that is determined from the polyester monomer used and the radical polymerizable monomer used, i.e., the value of (δv−δpe), is 1.06.

Manufacture of Toner Particles 2-3

The final toner is obtained by preparing a pigment dispersion and an ester wax dispersion, then aggregating these, and further heating them to 78° C. for fusion of the particles, in the same manner as in Example 2-1, except that the above-mentioned dispersion of resin particles (2-6) is used. The volume-average particle diameter of the toner obtained is 5.3 μm; the volume-average particle size distribution is 1.22; and the shape of the toner particles is spherical.

Preparation of Developer 2-3 and Evaluation

In the same manner as in Example 2-1, except that the toner particles 2-3 are used, a developer 2-3 is prepared, and the charging characteristic and image quality thereof are evaluated. As a result of this, the developer initial charging characteristic is found to be 45 μC/g, and the sustainability thereof after aging is over 99%. The fixing characteristics and the image quality characteristics are evaluated in the same manner as in Example 2-1 to find that the developer 2-3 provides a fixing capability at a temperature as low as 100° C. and excellent image quality characteristics.

Example 2-4

Polymerization for Polyester Resin 2-4

Into a solution containing 161.8 parts by mass of sebacic acid (Log(P)=1.87), as a multivalent carboxylic acid; 57.7 parts by mass of 1,4-cyclohexanedimethanol (Log(P)=0.9), and 47.3 parts by mass of 1,6-hexanediol (Log(P)=0.6), as polyhydric alcohols; 350 parts by mass of a styrene monomer (Log(P)=2.67), 35 parts by mass of a butylacrylate monomer (Log(P)=1.88), and 24 parts by mass of dodecanethiol (Log(P)=5.14), as radical polymerizable monomers, scandium trifluoromethanesulfonate of the same amount as in Example 2-1 is added in the same manner as in Example 2-1 as the catalyst, and dissolved. Then, this mixture is charged into deionized water in which sodium dodecylbenzenesulfonate, and scandium trisdodecylsulfate are dissolved, and after the preliminary dispersion by means of ultrasonic wave, the solution is emulsification-dispersed by using an ultra high-pressure homogenizer (Nanomizer, manufactured by YOSHIDA KIKAI Co., Ltd.) to obtain an emulsified product having a volume-average particle diameter of 0.30 μm (measured with LA-700, manufactured by HORIBA, Ltd.). This emulsified product is thrown into a 3-L pressurized reactor equipped with a stirrer, and polymerization is carried out at 100° C. for 8 hrs under a nitrogen atmosphere to obtain a dispersion of resin particles (2-7). The reaction product maintains a stable emulsified state; the volume-average particle diameter is 0.30 μm; and the SD value, i.e., the ratio between the volume-average particle diameter and the number-average particle diameter (volume-average particle diameter/number-average particle diameter), is 1.3. The weight-average molecular weight of the polyester resin is 16,000.

Polymerization of Radical Polymerizable Monomer 2-4

Polymerization is carried out in the same manner as for the dispersion of resin particles (2-2) in Example 2-1 to obtain a dispersion of resin particles (2-8), except that the dispersion of resin particles (2-7) is used, and 5 parts by mass of acrylic acid is used instead of the maleic acid. The particle diameter of the resin particles obtained is 0.35 μm; the SD value is 1.3; the polymerization yield for the radical polymerizable monomers is over 99%; the weight-average molecular weight exhibits a peak at 16,000 and 30,000; and the melting point is 65° C. The difference in weight-average solubility parameter that is determined from the polyester monomer used and the radical polymerizable monomer used, i.e., the value of (δv−δpe), is 1.30.

Manufacture of Toner Particles 2-4

The final toner is obtained by preparing a pigment dispersion and an ester wax dispersion, then aggregating these, and further heating them to 90° C. for fusion of the particles, in the same manner as in Example 2-1, except that the above-mentioned dispersion of resin particles (2-8) is used. The volume-average particle diameter of the toner obtained is 5.6 μm; the volume-average particle size distribution is 1.25; and the shape of the toner particles is spherical.

Preparation of Developer 2-4 and Evaluation

In the same manner as in Example 2-1, except that the toner particles 2-4 are used, a developer 2-4 is prepared, and the charging characteristic and image quality thereof are evaluated. As a result of this, the developer initial charging characteristic is found to be 40 µC/g, and the sustainability thereof after aging is over 99%. The fixing characteristics and the image quality characteristics are evaluated in the same manner as in Example 2-1 to find that the developer 2-4 provides a fixing capability at a temperature as low as 100° C. and excellent image quality characteristics.

Comparative Example 2-1

In order to demonstrate the excellence in charging characteristic, fixing characteristics, and image quality characteristics of the toner based on the excellent dispersion of resin particles (the dispersion of polyester resin particles) in the present invention, the direct polymerization for polyester by bulk polymerization that has been conventionally performed, the preparation of resin particles in an aqueous medium by the mini-emulsion method, the manufacture of a toner based thereon, and the characteristics of the toner will be described as Comparative Example 2-1.

Polymerization for Polyester Resin 2-5

After charging 184.2 parts by mass of dodecanedioic acid, 128.2 parts by mass of 1,9-nonanediol, and 2 parts by mass of dibutyltinoxide as the catalyst into a three-necked flask, the container is evacuated of air by a pressure reduction operation, and further is placed under an inert atmosphere with nitrogen gas, and while mechanical stirring, reflux is carried out at 180° C. for 12 hrs, resulting in a viscous condition being produced. Then, using GPC (gel permeation chromatography), the molecular weight of the polyester resin obtained is determined to find that the product has a weight-average molecular weight of 21,000. The melting point thereof is measured by DSC in the same manner as in Example 2-1 to find that the value is 70° C.

After this resin is dissolved into a mixture of radical polymerizable monomers, i.e., 350 parts by mass of a styrene monomer, 50 parts by mass of a butylacrylate monomer, and 24 parts by mass of dodecanethiol, while being heated at 80° C., the mixture is charged into 1700 parts by mass of deionized water in which 11 parts by mass of sodium dodecylbenzenesulfonate is dissolved, and after preliminary dispersion using a homogenizer (Ultra-Tarrax T50, manufactured by IKA Labortechnik GmbH), the solution is further emulsification-dispersed at 150° C. by using an ultra high-pressure homogenizer (Nanomizer, manufactured by YOSHIDA KIKAI Co., Ltd.) to obtain a dispersion of polyester resin particles (2-9) having a volume-average particle diameter of 0.9 µm and an SD value of 3.8, exhibiting a broad distribution of emulsified particle diameters ranging to over 5 µm.

Polymerization of Radical Polymerizable Monomer 2-5

Polymerization is carried out in the same manner as for the dispersion of resin particles (2-2) in Example 2-1 to obtain a dispersion of resin particles (2-10), except that the dispersion of resin particles (2-9) is used, and the maleic acid is not used. The particle diameter of the resin particles obtained is 1.1 µm; the SD value is 4.0; the polymerization yield for the radical polymerizable monomers is 99%; the weight-average molecular weight exhibits a peak at 21,000 and 31,000; and the melting point is 69° C. In addition, the difference in weight-average solubility parameter that is determined from the polyester monomer used and the radical polymerizable monomer used, i.e., the value of ($\delta v - \delta pe$), is 1.02.

Manufacture of Toner Particles 2-5

The final toner is obtained by preparing a pigment dispersion and an ester wax dispersion, then aggregating these, and further heating them to 78° C. for fusion of the particles, in the same manner as in Example 2-1, except that the above-mentioned dispersion of resin particles (2-10) is used. The volume-average particle diameter of the toner obtained is 8.9 µm, and the volume-average particle size distribution is 1.45, giving a broad distribution ranging from under 1 µm to over 10 µm, with the shape of the toner particles being potato-like, but it is considered that the particle diameter and the particle size distribution present a big problem on practical use as a high-image quality toner.

Preparation of Developer 2-5 and Evaluation

In the same manner as in Example 2-1, except that the toner particles 2-5 are used, a developer 2-5 is prepared, and the charging characteristic, the fixing capability, and the image quality therefor are evaluated in the same manner as in Example 2-1. As a result of this, it is found that the developer initial charging characteristic greatly varied from 2 µC/g to 20 µC/g, and the sustainability thereof after aging is under 30%, which presents big problems of reproducibility and sustainability of the charging characteristic for practical use. The fixing temperature is 120° C., but in terms of the image quality characteristics, the image quality unevenness is prominent, the toner is scattered much, and the fine line reproducibility also presents a big problem for practical use.

Comparative Example 2-2

Polymerization for Polyester Resin 2-6

Into a solution containing 214.9 parts by mass of adipic acid (Log(P)=0.2), as a multivalent carboxylic acid; 84.3 parts by mass of ethyleneglycol (Log(P)=−0.79), as a polyhydric alcohol; 350 parts by mass of a styrene monomer (Log(P)=2.67), 35 parts by mass of a butylacrylate monomer (Log(P)=1.88), and 24 parts by mass of dodecanethiol (Log(P)=5.14), as radical polymerizable monomers, scandium trifluoromethanesulfonate is added in the same manner as in Example 2-1 as the catalyst, and dissolved. Then, this mixture is charged into deionized water in which sodium dodecylbenzenesulfonate, and scandium trisdodecylsulfate are dissolved, and after the preliminary dispersion by means of ultrasonic wave, the solution is further emulsification-dispersed by using an ultra high-pressure homogenizer (Nanomizer, manufactured by YOSHIDA KIKAI Co., Ltd.) to obtain an emulsified product having a volume-average particle diameter of 0.30 µm (measured with LA-700, manufactured by HORIBA, Ltd.). This emulsified product is thrown into a 5-L pressurized reactor equipped with a stirrer, and polymerization is carried out at 100° C. for 24 hrs under a nitrogen atmosphere to obtain a dispersion of resin particles (2-11). The reaction product maintains a stable emulsified state; the volume-average particle diameter is 0.70 µm; and the SD value is 1.3. The weight-average molecular weight of the polyester resin is 800, and with this low molecular weight being kept, a saturated state is brought about, which presents problems of manufacture thereof, and toner characteristics.

Polymerization of Radical Polymerizable Monomer 2-6

Polymerization is carried out in the same manner as for the dispersion of resin particles (2-2) in Example 2-1 to obtain a dispersion of resin particles (2-12), except that the dispersion of resin particles (2-11) is used, and 5 parts by mass of acrylic acid is used instead of the maleic acid. The particle diameter of the resin particles obtained is 0.70 µm; the SD value is 1.3; the polymerization yield for the radical polymerizable monomers is over 99%; the weight-average molecular weight exhibits a peak at 800 and 30,000; and the melting point is 47° C. In addition, the difference in weight-average solubility parameter that is determined from the polyester monomer used and the radical polymerizable monomer used, i.e., the value of (δv−δpe), is 0.13.

Manufacture of Toner Particles 2-6

The final toner is obtained by preparing a pigment dispersion and an ester wax dispersion, then aggregating these, and further heating them to 78° C. for fusion of the particles, in the same manner as in Example 2-1, except that the above-mentioned dispersion of resin particles (2-12) is used. The volume-average particle diameter of the toner obtained is 7.0 μm, and the volume-average particle size distribution is 1.35, giving a broad distribution ranging from under 1 μm to over 10 μm, with the shape of the toner particles being potato-like, but it is considered that the particle diameter and the particle size distribution present a big problem for practical use as a high-image quality toner.

Preparation of Developer 2-6 and Evaluation

In the same manner as in Example 2-1, except that the toner particles 2-6 are used, a developer 2-6 is prepared, and the charging characteristic, the fixing capability, and the image quality thereof are evaluated in the same manner as in Example 2-1. As a result of this, it is found that the developer initial charging characteristic is 3 μC/g, and the sustainability thereof after aging is under 30%, which presents big problems of reproducibility and sustainability of the charging characteristic for practical use. The fixing temperature is 110° C., but in terms of the image quality characteristics, the image quality unevenness is prominent, the toner is scattered much, and the fine line reproducibility also presents a big problem for practical use.

The results of the examination in the above-mentioned Examples and Comparative Examples are collectively given in Table 2. The evaluation criteria for the respective evaluation items have been established as follows.

(Particle Size Distribution for Dispersion of Resin Particles)

The particle size distribution for a particular dispersion of resin particles is evaluated according to the following evaluation criteria:
A: SD value is under 1.5.
B: SD value is 1.5 to under 3.0.
C: SD value is 3.0 or more.

(Volume-average Particle Diameter for Dispersion of Resin Particles)

The volume-average particle diameter for a particular dispersion of resin particles is evaluated according to the following evaluation criteria:
A: Volume-average particle diameter is under 0.3 μm.
B: Volume-average particle diameter is 0.3 μm to under 0.7 μM.
C: Volume-average particle diameter is 0.7 μm or more.

(Stability of Dispersion of Resin Particles)

The stability of a particular dispersion of resin particles is determined according to the following criteria. 150 mL of the latex prepared is placed in a glass bottle of 300 mL, and left for 1 week in a 60° C. thermostat. The stability of the latex after 1 week is determined according to the following criteria. The grade "A" is defined to be acceptable.
A: A good dispersibility is exhibited with no sedimentation and separation.
B: A slight separation can be seen.
C: Sedimentation and separation occur.

(Charging Characteristic of Toner)

The charging characteristic of a particular toner is evaluated according to the following evaluation criteria:
A: Initial amount of charging is 30 μC/g or more.
B: Initial amount of charging is 20 μC/g to under 30 μC/g.
C: Initial amount of charging is under 20 μC/g.

(Charging Sustainability for Toner)

The charging sustainability for a particular toner is evaluated according to the following evaluation criteria:
A: Sustainability of amount of charging after 1 week aging is 90% or more.
B: Sustainability of amount of charging after 1 week aging is 50% to under 90%.
C: Sustainability of amount of charging after 1 week aging is under 50%.

(Particle Size Distribution for Toner)

The particle size distribution for a particular toner is evaluated according to the following evaluation criteria:
A: GSDv is under 1.30.
B: GSDv is 1.30 to under 1.40.
C: GSDv is 1.40 or over.

(Image Quality Characteristics)

The image quality characteristics are evaluated according to the following evaluation criteria:
A: No toner is scattered, and a sufficient image density and a uniform image quality are obtained, thus good image quality characteristics presenting no problems for practical use are provided.
B: A slight toner scattering is found, but an image density presenting no problems for practical use and a uniform image quality are obtained.
C: Marked toner scattering is observed, and the initial image density and the uniformity of image quality are insufficient, which presents problems for practical use.

TABLE 2

|  | Example 2-1 | Example 2-2 | Example 2-3 | Example 2-4 | Comparative Example 2-1 | Comparative Example 2-1 |
|---|---|---|---|---|---|---|
| Polyester monomer[1] | C4-Ac (0.2)[2] | C10-Ac(2.7)[2] | C10-Ac (2.7)[2] | C8-Ac (1.87)[2] | — | C4-Ac (0.2)[2] |
|  | C9-OH (1.86)[2] | C9-OH(1.86)[2] | C9-OH (1.86)[2] | C6-OH (0.6)[2] | — | C2-OH (−0.79)[2] |
|  | IPB (2.85)[2] | IPB (2.85)[2] | — | CC6-OH (0.9)[2] | — | — |
| \|δv − δpc\| | 1.09 | 1.06 | 1.06 | 1.30 | 1.02 | 0.13 |
| Weight average | 23000 | 18000 | 15000 | 16000 | 21000 | 800 |
| molecular weight of resin particles | 31000 | 29000 | 30000 | 30000 | 31000 | 30000 |
| Charging characteristic of toner | A | A | A | A | C | C |
| Charging sustainability of toner | A | A | A | A | C | C |
| Toner particle size distribution | A | A | A | A | C | B |

TABLE 2-continued

|  | Example 2-1 | Example 2-2 | Example 2-3 | Example 2-4 | Comparative Example 2-1 | Comparative Example 2-1 |
|---|---|---|---|---|---|---|
| Image quality characteristic | A | A | A | A | C | C |
| Stability of dispersion of fine resin particles | A | A | A | A | C | A |
| Particle size distribution of dispersion of resin particles (SD value) | A | A | A | A | C | A |
| Volume average molecular weight of resin particles | A | A | A | B | C | C |
| Remarks |  |  |  |  | Conventional bulk + mini-emulsion method |  |

[1])C10-Ac: 1,10-dodecanedioic acid; C9-OH: 1,9-nonanediol; IPB: 5-t-butylisophthalic acid; C8-Ac: Sebacic acid; C6-OH: 1,6-hexanediol; CC6-OH: 1,4-cyclohexanedimethanol; C4-Ac: Adipic acid; C2-OH: Ethyleneglycol
[2])Log (P) value As is apparently from Examples 2-1 to 2-4 and Comparative Examples 2-1 and 2-2, it is found that the toners manufactured in the Examples are excellent in all of toner manufacturability, charging characteristic, fixing characteristics, and image quality characteristics. Thereby, it is also found that, in the dispersions of resin particles obtained in the Examples, resin particles in which the polyester surface is satisfactorily coated with a radical polymer, the surface exposure of the polyester is suppressed, and particle diameter and sharp particle size distribution thereof are small, are stably emulsified and dispersed.

Further, it can also be comprehended that a polyester toner featuring low environmental load (low energy) and high-image quality, which has been conventionally considered to be difficult, can be manufactured.

What is claimed is:

1. A toner for developing electrostatic latent images, comprising resin particles containing an amorphous polymer and a crystalline polymer, wherein:
a mass ratio between the crystalline polymer and the amorphous polymer is 60:40 to 90:10, and
the amorphous polymer and the crystalline polymer satisfy the relationship represented by the following formula (1):

$$\delta a - \delta c \geq 1.05 [(cal/ml)^{1/2} (25°C.)] \quad \text{Formula (1)}$$

wherein $\delta a$ represents a solubility parameter of the amorphous polymer, and & represents a solubility parameter of the crystalline polymer.

2. The toner according to claim 1, wherein the crystalline polymer has a melt viscosity of 10 Pa·S to 10,000 Pa·S at a temperature that is 20° C. higher than a melting point thereof.

3. The toner according to claim 1, wherein at least one component contained in the amorphous polymer is selected from a radical polymerizable unsaturated acid monomer having a solubility in water of 80 (g/100 g-$H_2O$) or less at 25° C. and an acid anhydride thereof.

4. The toner according to claim 3, wherein the radical polymerizable unsaturated acid monomer or acid anhyciride thereof is at least one monomer selected from the group consisting of fumaric acid, maleic acid, maleic anhydride, itaconic acid, itaconic anhydride, and derivatives thereof.

5. A method for manufacturing the toner for developing electrostatic latent images according to claim 1, comprising:
coalescing the crystalline polymer and the amorphous polymer in an aqueous medium to form resin particles; and
mixing at least a dispersion of resin particles in which the resin particles are dispersed, and a colorant dispersion in which a colorant is dispersed, aggregating the resin particles and the colorant to a toner particle diameter in the aqueous medium, and heating the obtained aggregate for coalescence thereof.

6. The method according to claim 5, wherein the resin particles are resin particles obtained by mixing the crystalline polymer and a radical polymerizable monomer for forming the amorphous polymer to prepare a mixture, and then emulsification-dispersing the mixture in an aqueous medium for radical polymerization of the radical polymerizable monomer.

7. The method according to claim 6, wherein the radical polymerization is polymerization by the mini-emulsion method.

8. The method according to claim 5, wherein the resin particles are resin particles obtained by emulsifying or dispersing a polycondensable polyester monomer and a radical polymerizable monomer in an aqueous medium, and then carrying out polycondensation and radical polymerization; wherein the absolute value |$\delta v - \delta pe$| of the difference between a weight-average solubility parameter $\delta pe$ of the whole of the polycondensable polyester monomer and a weight-average solubility parameter $\delta v$ of the whole of the radical polymerizable monomer is 1.05 [(cal/ml)$^{1/2}$ (25°C.)] or more, and a hydrophobic parameter Log (P) of the polycondensable polyester monomer and the radical polymerizable monomer is in a range of −0.5 to 20.

9. The method according to claim 8, wherein a vinyl monomer is used as the radical polymerizable monomer.

10. The method according to claim 8, wherein a radical polymerizable unsaturated acid monomer having a solubility in water of 80% at 25° C. or less or the acid anhydride thereof is used as the radical polymerizable monomer together with the vinyl monomer.

11. The method according to claim 8, wherein the polycondensable polyester monomer and the radical polymerizable monomer are emulsified or dispersed in the aqueous medium after the polycondensable polyester monomer is previously dissolved in the radical polymerizable monomer.

12. The method according to claim 8, wherein the obtained resin particles have a core/shell structure, in which the periphery of a core is covered with a shell, the core being made up of a polyester resulting from polycondensation of the polycondensable polyester monomer and the shell being made up of a radical polymer resulting from radical polymerization of the radical polymerizable monomer.

13. A developer for electrostatic latent images comprising a toner and a carrier, wherein the toner is the toner for developing electrostatic latent images according to claim 1.

14. The developer according to claim 13, wherein the carrier has a resin coating layer.

15. An image forming method, comprising forming an electrostatic latent image on a latent image-holding member surface; developing the electrostatic latent image formed on the latent image-holding member surface with a developer containing a toner to form a toner image; transferring the toner image formed on the latent image-holding member surface onto a transfer material surface; and heat-fixing the toner image transferred onto the transfer material surface, wherein the toner used is the toner for developing electrostatic latent images according to claim 1.

16. The image forming method according to claim 15, wherein the crystalline polymer comprised in the toner for developing electrostatic latent images has a melt viscosity of 10 Pa·S to 10,000 Pa·S at a melting point temperature that is 20° C. higher than a melting point thereof.

17. The image forming method according to claim 15, wherein a mass ratio between the crystalline polymer and the amorphous polymer which are comprised in the toner for developing electrostatic latent images is 70:30 to 80:20.

* * * * *